(12) United States Patent
Yokoi et al.

(10) Patent No.: US 11,193,850 B2
(45) Date of Patent: Dec. 7, 2021

(54) HEATER PIPE GAS LEAK DETECTING DEVICE AND HEATER PIPE GAS LEAK DETECTING METHOD

(71) Applicant: SHIBAURA MECHATRONICS CORPORATION, Yokohama (JP)

(72) Inventors: Masataka Yokoi, Yokohama (JP); Nobuo Kobayashi, Yokohama (JP); Masaaki Furuya, Yokohama (JP); Atsushi Kinase, Yokohama (JP)

(73) Assignee: SHIBAURA MECHATRONICS CORPORATION, Yokohama (JP)

( * ) Notice: Subject to any disclaimer, the term of this patent is extended or adjusted under 35 U.S.C. 154(b) by 185 days.

(21) Appl. No.: 16/587,737

(22) Filed: Sep. 30, 2019

(65) Prior Publication Data

US 2020/0025643 A1 Jan. 23, 2020

Related U.S. Application Data

(63) Continuation of application No. PCT/JP2018/011993, filed on Mar. 26, 2018.

(30) Foreign Application Priority Data

Mar. 31, 2017 (JP) .............................. JP2017-071250

(51) Int. Cl.
| | |
|---|---|
| *G01M 3/28* | (2006.01) |
| *H05B 3/06* | (2006.01) |
| *G01M 3/00* | (2006.01) |

(52) U.S. Cl.
CPC .......... *G01M 3/2815* (2013.01); *G01M 3/002* (2013.01); *H05B 3/06* (2013.01)

(58) Field of Classification Search
CPC .......... G01M 3/002; G01M 3/26; G01M 3/28; G01M 3/2815; G01M 3/2846; H05B 3/06; H05B 2203/014; H05B 3/44; H05B 3/04
See application file for complete search history.

(56) References Cited

U.S. PATENT DOCUMENTS

| | | | | |
|---|---|---|---|---|
| 5,267,447 A | * | 12/1993 | Yamamoto | ................ F17C 7/00 62/50.7 |
| 2004/0084083 A1 | * | 5/2004 | Pearson | .................... C01B 3/00 137/312 |
| 2012/0048000 A1 | * | 3/2012 | Kirzhner | ................. F23K 5/007 73/40.5 R |

FOREIGN PATENT DOCUMENTS

JP H02-044681 A 2/1990

* cited by examiner

*Primary Examiner* — Benjamin R Schmitt
(74) *Attorney, Agent, or Firm* — Kratz, Quintos & Hanson, LLP

(57) ABSTRACT

A gas leak detecting device of a heater pipe and a gas leak detecting method of a heater pipe, which are able to reliably detect a leak of gas from a heater pipe in which a fine hole is formed. A gas leak detecting device of a heater pipe, which is provided with an inside pipe housing a heater element and an outside pipe sealed surrounding the inside pipe and which is adjusted by a pressure adjustment mechanism in gas pressure in a space between the outside pipe and the inside pipe to a predetermined pressure value. The gas leak detecting device includes a gas flow resistance part, a pressure detection unit, and a leak judging device that judges whether gas is leaking from the heater pipe based on a detected pressure value obtained by the pressure detection unit.

15 Claims, 17 Drawing Sheets

HEATER PIPE GAS LEAK DETECTING DEVICE AND HEATER PIPE GAS LEAK DETECTING METHOD

This application is continuation application of International Application NO. PCT/JP2018/011993 filed on Mar. 26, 2018 and designated the U.S. which claims the benefit of Japanese Patent application NO. 2017-071250 filed on Mar. 31, 2017, the entire contents of which are incorporated herein by reference.

TECHNICAL FIELD

The present invention relates to a gas leak detecting device of a heater pipe having an internal gas pressure adjusted to a predetermined pressure value and to a gas leak detecting method of a heater pipe.

BACKGROUND ART

For example, PTL 1 discloses a method of monitoring for breakage of an industrial use heater. A heater pipe used for an industrial use heater which is monitored for breakage in this way has a two-layer structure of an inside pipe made of quartz holding a heater element (heater wire) and an outside pipe similarly made of quartz surrounding the outside of the same. The heater body is supplied with power through an electric power line introduced from the outside and generates heat. The outside pipe surrounds the inside pipe in a state in which air tightness is held. Between the inside pipe and the outside pipe, a sealed space is formed. That is, this heater pipe is configured as a sealed container by the inside pipe and outside pipe.

A heater pipe of such a structure (industrial use heater) is supplied with compressed air from a compressor at the sealed space between the inside pipe and the outside pipe. Further, the heater pipe is placed submerged in a chemical in a chemical tank and heats the chemical in a state with the gas pressure of the sealed space adjusted to a predetermined pressure value. At the chemical tank, for example, a substrate is subjected to the desired treatment (for example, etching) by the chemical in the heated state.

In such a method for monitoring for breakage of an industrial use heater, a pressure sensor is provided in the path of supply of compressed air to the heater pipe. The pressure value detected at that pressure sensor is monitored. For example, if the outside pipe immersed in the chemical is corroded and pitted or external impact etc. causes the outside pipe to break, air will leak from that pitting or broken place, the gas pressure of the space between the outside pipe and inside pipe will fall, and along with this the pressure value detected at that pressure sensor will fall. The drop of this detected pressure value is used to detect abnormality of the heater pipe (industrial use heater).

CITATIONS LIST

Patent Literature

PLT 1: Japanese Patent Publication No. 2-44681

SUMMARY

Technical Problem

In the above-mentioned conventional method for monitoring for breakage, due to the compressor, the sealed space (sealed container) is constantly supplied with compressed air, so the gas pressure of the sealed space is maintained at a predetermined pressure value. On the other hand, for example, if there is a fine hole (pinhole) in the outside pipe, the amount of air leaking from the sealed space will be small. For this reason, even if a leak occurs from the outside pipe, due to the compressor, the space ends up being immediately adjusted to a predetermined pressure and sometimes the pressure value detected at the pressure sensor does not fall. In such a case, it is not possible to detect a leak of gas from the outside pipe of the heater pipe, that is, breakage of the outside pipe.

The present invention was made in consideration of such a situation and provides a gas leak detecting device of a heater pipe comprised of an outside pipe and inside pipe which is able to reliably detect a leak of gas from a fine hole formed in the outside pipe of the heater pipe even when such a hole is formed.

Solution to Problem

A gas leak detecting device of a heater pipe which is provided with an inside pipe housing a heater element and an outside pipe sealed surrounding the inside pipe, is coupled by piping with a pressure adjustment mechanism, and is adjusted by the pressure adjustment mechanism in gas pressure in a space between the outside pipe and the inside pipe to a predetermined pressure value, the gas leak detecting device comprising a gas flow resistance part provided at the piping and locally resistant to flow of gas at the piping defining a gas flow path, a pressure detection unit detecting gas pressure in the space between the outside pipe and the inside pipe of the heater pipe at a position between the gas flow resistance part and the heater pipe in the piping, and leak judging means for judging whether the heater pipe is leaking based on a detected pressure value obtained by the pressure detection unit.

A gas leak detecting method of a heater pipe which is provided with an inside pipe housing a heater element and an outside pipe sealed surrounding this inside pipe, is coupled by piping with a pressure adjustment mechanism, and is adjusted by the pressure adjustment mechanism in gas pressure in a space between the outside pipe and the inside pipe to a predetermined pressure value, the gas leak detecting method comprising a pressure detection step detecting gas pressure in the space between the outside pipe and the inside pipe of the heater pipe at a position between the gas flow resistance part and the heater pipe in a state making flow of gas locally harder at a flow resistance position of the piping defining a gas flow path and a leak judging step judging whether gas is leaking from the heater pipe based on a detected pressure value obtained in the pressure detection step.

Advantageous Effects of Invention

According to the gas leak detecting device of a heater pipe and gas leak detecting method of a heater pipe according to the present invention, even if a fine hole is formed in an outside pipe of a heater pipe, it is possible to reliably detect a leak of gas from that hole.

DESCRIPTION OF EMBODIMENTS

Below, embodiments of the present invention will be explained using the drawings.

Figure 1:
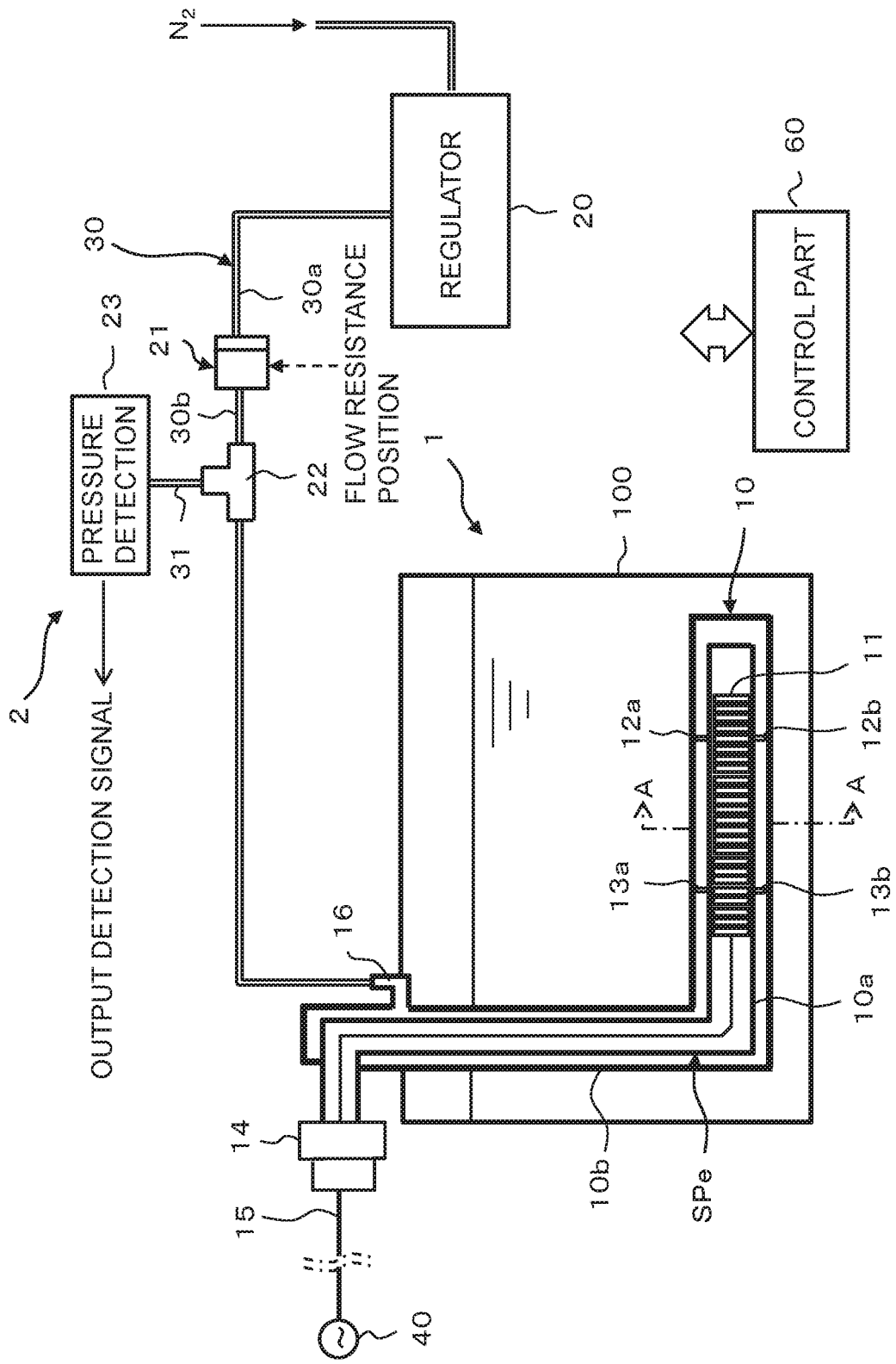
FIG. 1 is a view showing an example of the configuration of a gas leak detecting device according to a first embodiment of the present invention.

The gas leak detecting device of a heater pipe according to a first embodiment of the present invention is configured as shown in FIG. 1. This gas leak detecting device detects a leak of gas from a heater pipe utilized for an etching treatment apparatus or other treatment apparatus 1.

In FIG. 1, the heater pipe 10 for which a leak is detected forms a two-layer structure by an L-shaped inside pipe 10a made of quartz housing a heater wire 11 (heater element) and the same L-shaped outside pipe 10b made of quartz sealed surrounding the outside of the inside pipe 10a. At the rear end part of the inside pipe 10a, a cap 14 is attached. A power line 15 passing through that cap 14 and extending from the power source 40 is introduced into the inside pipe 10a. The power line 15 is connected to the heater wire 11 inside the inside pipe 10a. The heater wire 11 receives power from the power source 40 through the power line 15 and generates heat. Note that, in FIG. 1, illustration of a control circuit for turning on/off the supply of power to the heater wire 11 is omitted.

The outside diameter of the inside pipe 10a is smaller than the inside diameter of the outside pipe 10b. Between the inside pipe 10a and the outside pipe 10b, a space SPe (sealed space) is formed. To maintain the distance between an outside wall of the inside pipe 10a and an inside wall of the outside pipe 10b uniform, spacers are provided between the outside wall of the inside pipe 10a and the inside wall of the outside pipe 10b. In the present embodiment, as shown enlarged in FIG. 2, a group of three spacers 12a, 12b, and 12c made of glass are arranged at equal intervals around one turn of the heater pipe 10. Further, at positions predetermined distances from the group of the three spacers 12a, 12b, and 12c, similarly, another group of three spacers 13a, 13b, and 13c made of glass (in FIG. 1, the spacer 13e not shown) are provided at equal intervals around one turn. In the state where the two groups of spacers 12a to 12c and 13a to 13c are used to support the inside pipe 10a in the outside pipe 10b, as explained above, the space SPe is formed between the inside pipe 10a and the outside pipe 10b. At the rear end side of the outside pipe 10b, a joint 16 communicating with the space SPe is provided.

The treatment apparatus 1 in which a heater pipe 10 of the above-mentioned structure is used has a treatment tank 100. Inside the treatment tank 100, a chemical (for example, phosphoric acid) is stored. The heater pipe 10 is set inside the treatment tank 100 so that in particular the part holding the heater wire 11 is submerged in the chemical (see FIG. 1). Further, when power is supplied to the heater wire 11, the heater wire 11 generates heat due to the supply of power. Due to this, the chemical is heated to a predetermined temperature, for example, 160° C. A treated object (for example, a semiconductor wafer) is inserted in the chemical heated and maintained at a predetermined temperature in this way. The treated object is treated by the chemical (for example, etched).

A gas leak detecting device 2 for the above-mentioned heater pipe 10 has a regulator 20 (pressure adjustment mechanism) connected by piping 30 to the heater pipe 10. Specifically, the piping 30 extending from the regulator 20 is connected to a joint 16 provided at the outside pipe 10b of the heater pipe 10. The regulator 20 is supplied with N2 gas (nitrogen gas) from a tank (not shown) and supplies N2 gas through the piping 30 to the heater pipe 10 by a predetermined pressure (for example, 20 KPa) to adjust the gas pressure in the space SPe of the heater pipe 10 to a preset pressure value Pcont (for example, 20 KPa). At a predetermined position of the piping 30 (referred to as the "flow resistance position"), a flow resistance block 21 of the later explained structure is provided. Further, in the piping 30, a T-joint 22 is provided between the flow resistance block 21 and joint 16 (heater pipe 10). Further, a pressure detection unit 23 is connected to piping 31 extending from the T-joint 22. The pressure detection unit 23 detects the gas pressure of the space SPe of the heater pipe 10 connected through the piping 31, T-joint 22, piping 30, and joint 16 and outputs a pressure detection signal corresponding to that detected pressure value. Note that, the regulator 20, pressure detection unit 23, etc. of the gas leak detecting device 2 are controlled by a control part 60.

Figure 3:
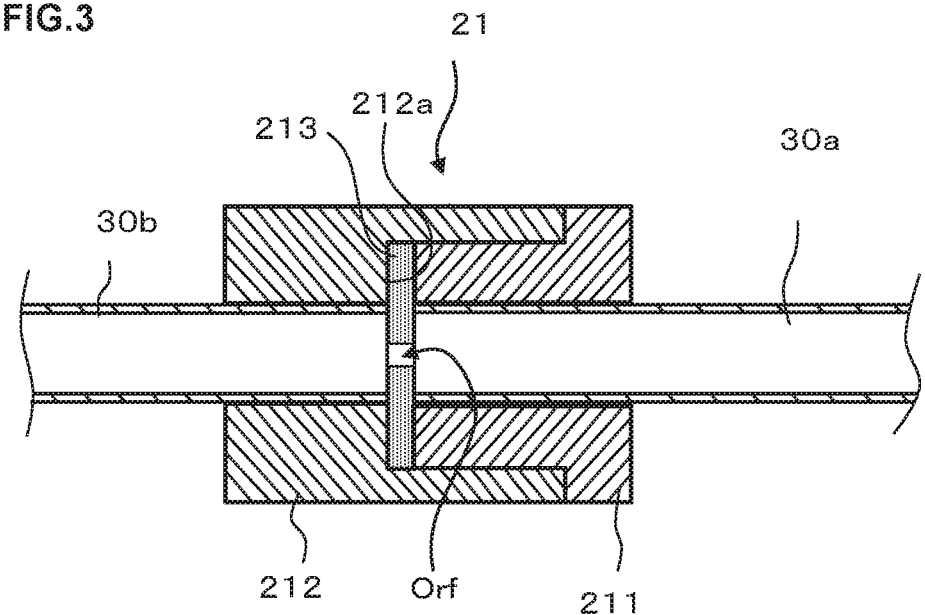
FIG. 3 is a cross-sectional view showing an internal structure of a flow resistance block shown in FIG. 1.

The above-mentioned flow resistance block 21 is configured as shown in FIG. 3.

In FIG. 3, the flow resistance block 21 is provided with a projecting block 211 in which upstream side piping 30a extending from the regulator 20 is inserted, a recessed block 212 in which downstream side piping 30b extending toward the T-joint 22 is inserted, and an orifice plate 213 at the center of which an orifice Orf is formed. A cross-sectional area (inside diameter) of the orifice Orf formed at the orifice plate 213 is set smaller than a cross-sectional area (inside diameter) of either of the upstream side piping 30a and the downstream side piping 30b. For example, when the inside diameter of the piping 30 (upstream side piping 30a or downstream side piping 30b) is 3 mm, the diameter of the orifice Orf formed at the orifice plate 213 is set to 0.3 mm.

The projecting block 211 and the recessed block 212 can be screwed together. The projecting block 211 is screwed to the recessed block 212 in the state with the orifice plate 213 made to abut against the inside bottom surface 212a of the recessed block 212. Due to this, the projecting block 211 and the recessed block 212 sandwich the orifice plate 213 between them. Further, in the state with the end edge of the upstream side piping 30a and the end edge of the downstream side piping 30b respectively abutting against the orifice plate 213 so as to surround the orifice Orf, the flow resistance block 21 is formed. Inside such a flow resistance block 21, in the gas (N2 gas) flow path extending from the upstream side piping 30a to the downstream side piping 30b, it becomes locally difficult for gas (N2 gas) to flow due to the orifice Orf of the orifice plate 213.

Figure 4:
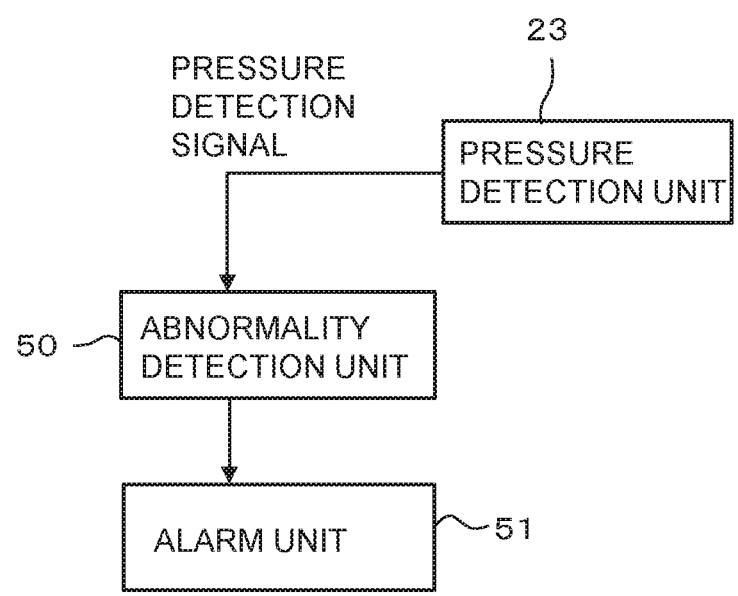
FIG. 4 is a block diagram showing an example of the basic configuration of a signal processing system in the gas leak detecting device.

The signal processing system of the gas leak detecting device 2, as shown in FIG. 4, has an abnormality detection unit 50. The abnormality detection unit 50 receives as input the pressure detection signal from the pressure detection unit 23 and detects a leak of gas (N2 gas) from the outside pipe 10b of the heater pipe 10 based on this pressure detection signal. That is, the abnormality detection unit 50 detects the formation of a fine hole (pinhole) in the outside pipe 10b due to corrosion by a chemical or breakage of the outside pipe 10b due to external impact. Further, this signal processing system has an alarm unit 51 (output unit) emitting an alarm (alarm message, alarm sound, etc.) (display of message, output of alarm sound) based on an abnormality detection signal which the abnormality detection unit 50 outputs at the time of detection of a leak.

As explained above, the gas pressure in the space SPe of the heater pipe 10 is adjusted by the regulator 20 at the pressure value Pcont. That is, this pressure value Pcont is a preset pressure value to which the gas pressure in the heater pipe 10 (sealed container) should be adjusted (target value of adjustment). More specifically, it is the gas pressure value to be adjusted to in the space SPe defined by the sealed space between the inside pipe 10a and the outside pipe 10b of the heater pipe 10.

The abnormality detection unit 50 receives as input and stores a reference pressure value Pth as a reference value for detection of a leak. If a leak occurs in the heater pipe 10, the gas pressure value at the sealed space of the heater pipe 10 decreases. The reference pressure value Pth is determined by investigating the correspondence between the amount of a leak and a decreasing pressure value in advance and adjusting it in accordance with the amount of leak desired to be detected. Therefore, this reference pressure value Pth is set as a value smaller than the pressure value Pcont (target value of adjustment). For example, it is about 75% of the pressure value Pcont. Note that, the heater pipe 10 is subjected to external disturbance due to the chemical, so the temperature of the heater pipe 10 fluctuates. For that reason, along with fluctuation of the temperature of the heater pipe 10, the gas pressure inside the sealed space of the heater pipe 10 will fluctuate. Therefore, the reference pressure value Pth is desirably determined considering fluctuation of the gas pressure of the sealed space of the heater pipe 10. Due to this, it is possible to prevent fluctuation of the pressure inside the sealed space being detected and mistaken notification being made despite the heater pipe 10 being normal.

The abnormality detection unit 50 judges if the detected pressure value is smaller than the reference pressure value Pth based on the pressure detection signal from the pressure detection unit 23. Further, when judging that detected pressure value is smaller than the reference pressure value Pth, it is deemed that gas (N2 gas) is leaking from the outside pipe 10a, that is, a pinhole has formed at the outside pipe 10b etc., and an abnormality detection signal is output. That is, the abnormality detection unit 50 is a pressure judging means and functions as a leak judging means.

Specifically, in the treatment tank 100 of the above-mentioned treatment apparatus 1, treated objects (for example, semiconductor wafers) are successively treated (for example, etched). In the process, the abnormality detection unit 50 of the gas leak detecting device 2 performs processing for detecting a leak in accordance with the routine shown in FIG. 5.

Figure 5:
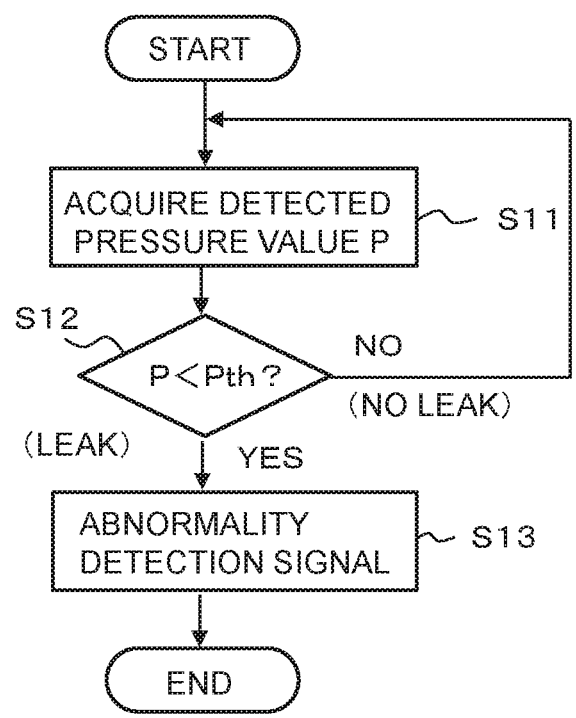
FIG. 5 is a flow chart showing a routine in processing for leak detection.

In FIG. 5, the abnormality detection unit 50 acquires the detected pressure value P based on the pressure detection signal from the pressure detection unit 23 (S11: pressure detection step) and judges if this detected pressure value P is smaller than the preset reference pressure value Pth (S12: leak judging step). In a state where the outside pipe 10b in the heater pipe 10 set inside the treatment tank 100 is free of pinholes and breakage (normal state), due to the operation of the regulator 20, the gas pressure of the space SPe between the inside pipe 10a and the outside pipe 10b at the heater pipe 10 is maintained at the pressure value Pcont (for example, 20 kPa). In this state, the detected pressure value P of the pressure detection unit 23 is maintained at a pressure value Pcont larger than the reference pressure value Pth. In this state, the abnormality detection unit 50 repeatedly judges that the acquired detected pressure value P (S11) is not smaller than the reference pressure value Pth (at S12, NO). As a result, the abnormality detection unit 50 does not output an abnormality detection signal.

Figure 6:
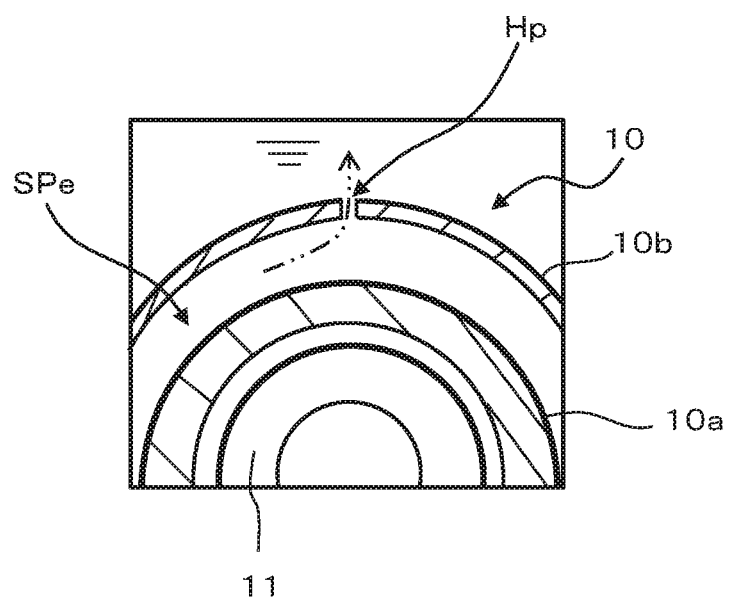
FIG. 6 is an enlarged cross-sectional view showing an example of the state where nitrogen gas (gas) is leaking from a heater pipe (outside pipe).
Figure 7:
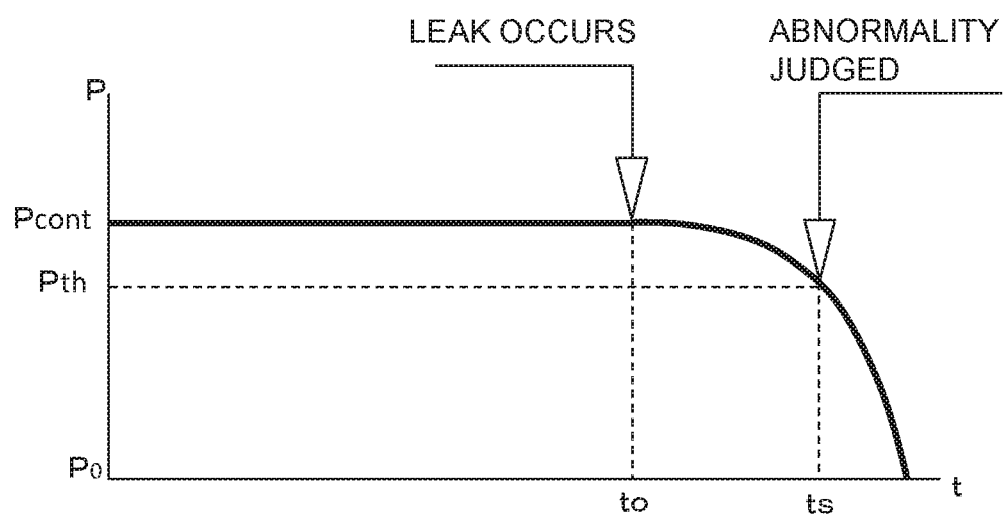
FIG. 7 is a graph showing a change in detected pressure value when nitrogen gas (gas) is leaking from a heater pipe.

On the other hand, for example, if, due to long time use of the heater pipe 10, the outside pipe 10b of the heater pipe 10 is corroded by a chemical and, as shown in FIG. 6, a pinhole Hp is formed in the outside pipe 10b, gas (N2 gas) will leak little by little through the pinhole Hp from the space SPe between the inside pipe 10a and the outside pipe 10b in the heater pipe 10. In particular, a pinhole easily forms at locations where the outside pipe 10b and spacers 12 and 13 are in contact. This is because locations where the outside pipe 10b and spacers 12 and 13 are in contact become hotter compared with locations where the outside pipe 10b and spacers 12 and 13 are not in contact. The reason why is that the heat generated from the heater wire 11 is conducted through the inside pipe 10a and spacers 12 and 13. For that reason, in the outside pipe 10b, the locations which easily become hot are faster in corrosion of the outside pipe 10b by the chemical contacting the locations. In this way, if making the decreasing gas pressure in the space SPe return to the pressure value Pcont in a state where gas (N2 gas) is leaking from a pinhole Hp formed in the outside pipe 10b, gas is supplied to the space SPe through the regulator 20. Here, the orifice plate 213 of the gas flow resistance block 21 restricts the flow of gas resulting in a pressure difference between the pressure inside the upstream side piping 30a and the pressure inside the downstream side piping 30b. As a result, as shown in FIG. 7, the gas pressure of the space SPe at the pressure value Pcont falls. That is, the detected pressure value P at the pressure detection unit 23 falls from the time of occurrence of the leak (time to) and becomes lower than the reference pressure value Pth (time ts). The abnormality detection unit 50, in this way, outputs an abnormality detection signal if the detected pressure value P at the pressure detection unit 23 falls below the reference pressure value Pth (S13). This being so, based on that abnormality detection signal, an alarm is issued from the alarm unit 51. Due to this alarm, the operator of the treatment apparatus 1 can learn that a pinhole Hp has formed in the outside pipe 10b or that the outside pipe 10b has broken etc. resulting in gas leaking from the heater pipe 10.

As explained above, by placing an orifice Orf (gas flow resistance block 21) in the piping 30 of the gas flow path from the regulator 20 to the heater pipe 10, if gas leaks from the heater pipe 10, the supply of gas from the regulator 20 is restricted. For this reason, in that gas flow path (piping 30), the pressure difference between the regulator 20 side and the heater pipe 10 side becomes greater. As a result, even with a slight gas leak due to a fine hole in the heater pipe 10, it is possible to detect that gas leak based on the detected pressure value P at the heater pipe 10 side falling below the reference pressure value Pth. Even if a slight hole forms in the outside pipe 10b of the heater pipe 10, the inside pipe 10a will not immediately break. There is a grace period until the inside pipe 10a breaks. For that reason, if able to learn that a pinhole has formed in the outside pipe 10b of the heater pipe 10, it is possible to prepare to replace the heater pipe 10 before the inside pipe 10a breaks. In this way, before the inside pipe 10a actually breaks, that can be predicted, so it is possible to change the treatment plan of the treated object (for example, etching step) and possible to keep the effect on the productivity to a minimum.

As explained above, even if breakage of the outside pipe 10b of the heater pipe 10 is detected, a certain extent of time is required until the chemical entering from the outside pipe 10b corrodes and breaks the inside pipe 10a. Therefore, even if the abnormality detection unit 50 detecting breakage of the outside pipe 10b outputs an abnormality detection signal, there is no need to immediately cut off the supply of power to the heater wire 11 to make the treatment apparatus 1 stop. For example, if an abnormality detection signal is output from the abnormality detection unit 50, the control part 60 need not immediately cut off the supply of power to the heater wire 11 of the heater pipe 10 but may cut off the supply of power to the heater wire 11 and stop the treatment apparatus 1 after treatment of a predetermined number of treated objects ends at the treatment apparatus 1. By doing this, when breakage of the outside pipe 10b of the heater pipe 10 is detected, it is possible to cut off the supply of power to the heater wire 11 of the heater pipe 10 and stop the treatment apparatus 1 while keeping down the effect on the treatment of the treated objects.

The detected pressure value P of the pressure detection unit 23 continues to fall along with the increase in size of the pinhole Hp even after falling below the reference pressure value Pth since the amount of gas leaking from the pinhole Hp of the outside pipe 10b further increases from the amount of supply of gas through the orifice Orf of the orifice plate 213. As shown in FIG. 7, it further falls and becomes P0. This P0 is the pressure at the time when the chemical penetrates to the space SPe of the heater pipe 10 due to the expansion of the pinhole Hp.

In the present embodiment, it is also possible to estimate the size (diameter) of a pinhole Hp in the leak state. Below, this point will be explained.

The conductance showing the ease of flow (difficulty of flow) of gas through the gas flow path from the regulator 20 through the orifice Orf of the orifice plate 213 to the pressure detection unit 23 (T-joint 22), is defined as C1, while the conductance showing the ease of flow (difficulty of flow) of gas through the gas flow path from the pressure detection unit 23 (T-joint 22) through the space SPe between the inside pipe 10a and the outside pipe 10b and through the pinhole Hp is defined as C. Further, the predetermined pressure value adjusted by the regulator 20 is defined as P1 while the detected pressure value of the pressure detection unit 23 in the state where there is a leak from the pinhole Hp is defined as Ps.

In the state where gas is leaking from the pinhole Hp, the pressure difference $\Delta P1$ before and after the orifice Orf at the gas passage is $$\Delta P1 = P1 - Ps$$

and the flow rate Q1 of the gas passing through the orifice Orf becomes $$Q1 = C1 \times \Delta P1 = C1 \times (P1 - Ps)$$

On the other hand, the pressure difference $\Delta P$ between the inside and outside of the pinhole Hp, assuming that the pressure at the outside of the pinhole Hp is atmospheric pressure, is $$\Delta P = Ps$$

while the flow rate Q of the gas passing through the pinhole Hp becomes:

$$Q = C \times \Delta P = C \times Ps$$

If assuming the flow rate Q1 of the gas passing through the orifice Orf and the flow rate Q of the gas passing through the pinhole Hp are equal, $$Q1 = Q$$

That is, $$C1 \times (P1 - Ps) = C \times Ps$$

From this formula, the detected pressure value Ps of the space SPe becomes:

$$Ps = \{C1/(C1+C)\} \times P1$$

If a pinhole Hp of the same extent as the orifice Orf is formed, the ease of flow (difficulty of flow) of gas passing through the orifice Orf and the ease of flow of pass (difficulty of flow) passing through the pinhole Hp become the same extent and the conductance C becomes substantially equal to the conductance C1 (C=C1). In this state, $$Ps = \{1/2\} \times P1$$

That is, if a pinhole Hp of the same extent as the orifice Orf forms, the detected pressure value Ps of the space SPe at the heater pipe 10 can be estimated as becoming ½ of the predetermined pressure value P1 adjusted to by the regulator 20.

For example, if the predetermined pressure value Pcont which the regulator 20 adjusts to is 20 KPa and the diameter of the orifice Orf formed by the orifice plate 213 is 0.3 mm, if the detected pressure value Ps of the space SPe in the heater pipe 10 becomes 10 KPa (½ of 20 kPa), it can be estimated that a pinhole Hp of a diameter of about 0.3 mm has formed in the outside pipe 10b of the heater pipe 10. Due to this, by setting the reference pressure value Pth at 10 KPa or more, for example, at about 14 KPa, the fact that a pinhole Hp smaller than a diameter of 0.3 mm has formed in the outside pipe 10b, that is, the fact that gas is leaking from such a small pinhole Hp, can be detected. Note that, when heating by the heater pipe 10 is started or when non-heated chemical is supplied to the treatment tank 100, that is, when the temperature of the space SPe fluctuates, the pressure of the space SPe fluctuates along with that, so it is preferable to set the reference pressure value Pth lower than the fluctuation of that pressure.

In the gas leak detecting device 2 of the heater pipe 10 according to the present embodiment, as explained above, it is possible to estimate the size of a pinhole Hp formed in the outside pipe 10b of the heater pipe 10 based on the relationship among the size of the orifice placed inside the piping 30, the pressure value P1 (Pcont) which the regulator adjusts to, and the detected pressure value Ps (P) of the space SPe in the heater pipe 10. From this, by monitoring in real time the detected pressure value P, it is possible to judge if the state of the leak is a dangerous state where the heater pipe 10 would break or if the size of the pinhole etc. causing the leak is similarly a dangerous state where heater pipe 10 would break. Therefore, it is possible to set a reference value of the state of a leak or size of a pinhole etc. and output a warning based on that reference value etc. Further, it is also possible to output a preliminary warning deeming the situation is one where from the state of the leak or the size of the pinhole etc., the heater pipe 10 will not immediately be damaged or break, but caution should be exercised. Due to this, it is possible to replace the heater pipe 10 and perform other maintenance in a planned manner and possible to perform efficient substrate treatment.

This means that by setting a plurality of reference pressure values th, it is possible to output a warning in stages. For example, if finding in advance that if the size of the pinhole is 0.3 mm, the heater pipe 10 will not immediately break, but if becoming 0.5 mm, it will break within several hours, it is possible to output a caution alarm at the time of a reference pressure value th1 when the size of the pinhole becomes 0.3 mm and output a warning that replacement is immediately necessary when the detected pressure falls from a reference pressure value th2 when the size becomes 0.5 mm. The levels of these reference pressure values th1 and th2 may be suitably determined in accordance with the time required for preparation of and replacement by a new heater pipe 10 etc.

A second embodiment of the present invention will be explained next.

Figure 8:
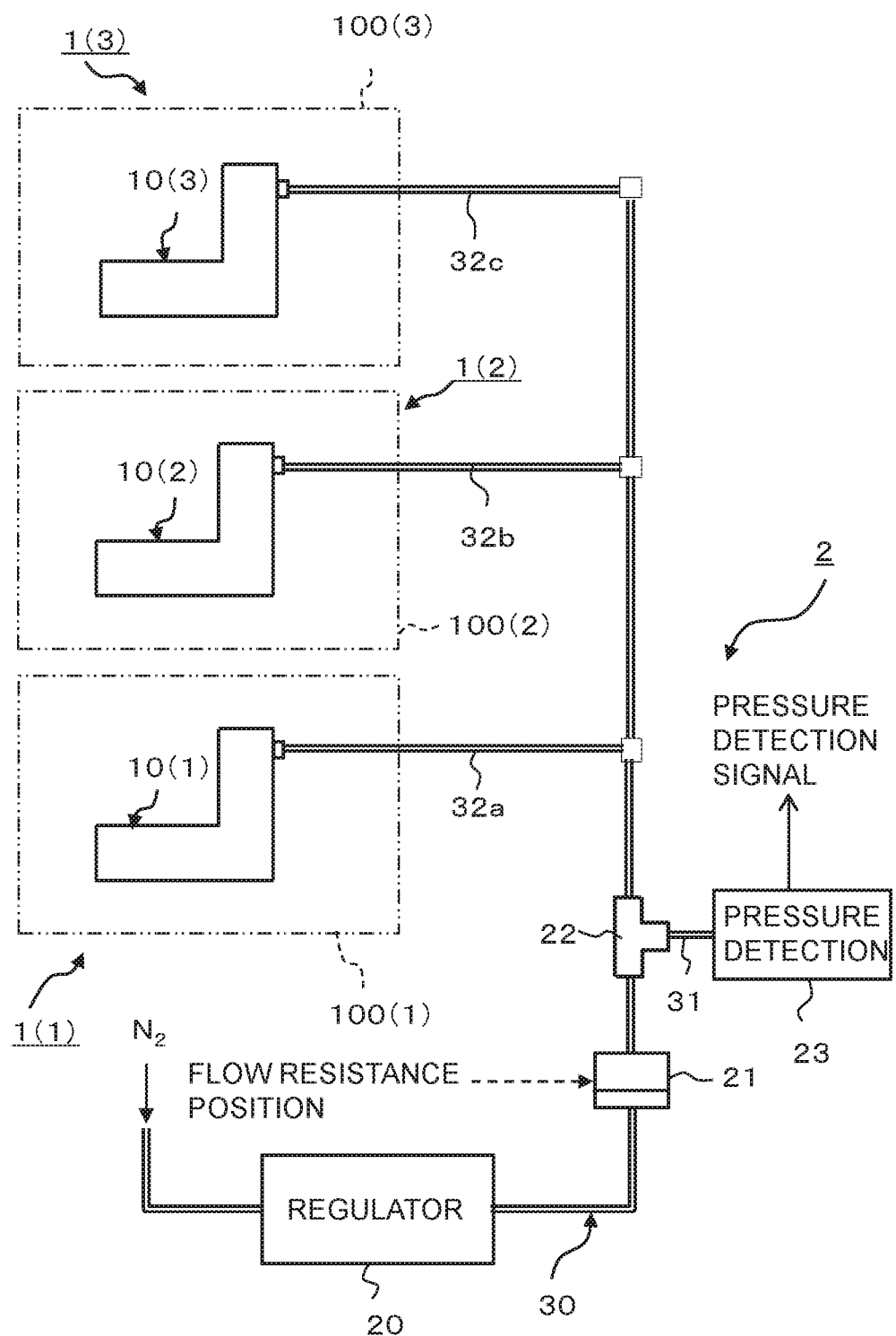
FIG. 8 is a view showing an example of the configuration of a gas leak detecting device according to a second embodiment of the present invention.

The gas leak detecting device of a heater pipe according to the second embodiment of the present invention is configured as shown in FIG. 8. This gas leak detecting device 2 detects a leak of gas from three heater pipes 10 utilized set at a plurality of (in this case, three) treatment tanks 100(1), 100(2), and 100(3). Specifically, a leak of gas from the first heater pipe 10(1), second heater pipe 10(2), and third heater pipe 10(3) is detected by the gas leak detecting device 2.

Note that, in the present embodiment, one heater pipe 10 each was provided for the treatment tanks 1(1), 1(2), and 1(3), but the invention is not limited to this. It is also possible to provide pluralities of heater pipes 10 for the treatment tanks 1(1), (2), and (3).

Figure 2:
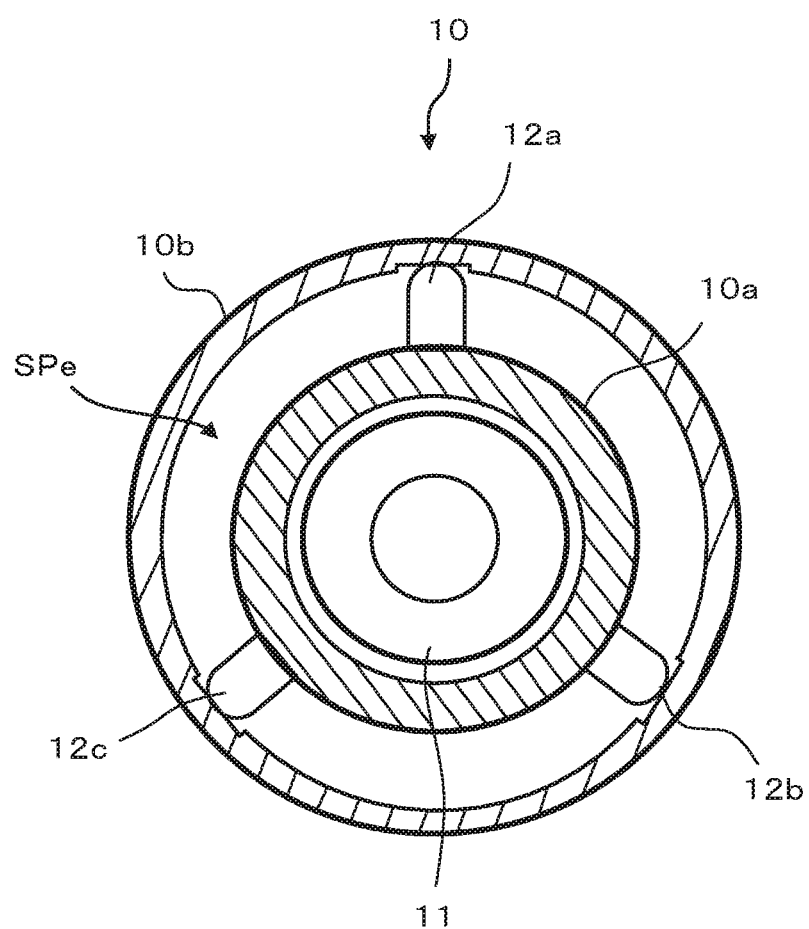
FIG. 2 is a cross-sectional view showing a cross-section along the line A-A of the heater pipe shown in FIG. 1.

In FIG. 8, the structures of the three heater pipes for which a gas leak is detected, that is, the first heater pipe 10(1), second heater pipe 10(2), and third heater pipe 10(3), are the same as the case of the above-mentioned first embodiment (see FIG. 1 and FIG. 2). That is, each heater pipe 10 is provided with an inside pipe 10a housing a heater wire 11 and an outside pipe 10b sealed surrounding this inside pipe 10a. Between the inside pipe 10a and the outside pipe 10b, a sealed space SPe is formed. The leak detection device 2 has a regulator 20 (pressure adjustment mechanism). A first heater pipe 10(1), second heater pipe 10(2), and third heater pipe 10(3) are connected to three branch pipings 32a, 32b, and 32c extending further branched from the piping 30 extending from this regulator 20 (in the second embodiment, referred to as the "main piping"). Further, the regulator 20 receives the supply of N2 gas from a tank (not shown) and supplies it through the main piping 30 and branch pipings 32a, 32b, 32c to the first heater pipe 10(1), second heater pipe 10(2), and third heater pipe 10(3). Due to such a regulator 20, the gas pressures at the insides of the first heater pipe 10(1), second heater pipe 10(2), and third heater pipe 10(3) (sealed space SPe) are adjusted in parallel to the pressure value Pcont (for example, 20 KPa).

In the main piping 30, between the regulator 20 and the branch pipings 32a, 32b, and 32c, a flow resistance block 21 of a structure similar to the above-mentioned structure (see FIG. 3) is provided. Further, a pressure detection unit 23 is connected through the T-joint 22 and the piping 31 to the main piping 30 between the flow resistance block 21 and the branch pipings 32a, 32b and 32c in the same way as the above-mentioned gas leak detecting device (see FIG. 1). The pressure detection unit 23 detects the gas pressures in the sealed spaces SPe of the three heater pipes 10(1), 10(2) and 10(3) through the piping 31, the T-joint 22, the main piping 30 and the three branch pipings 32a, 32b and 32c branching in parallel from the main piping 30. The pressure detection unit 23 outputs pressure detection signals corresponding to the detected pressure values.

The signal processing system of the gas leak detecting device 2, in the same way as the case of the above-mentioned first embodiment, is configured such as shown in FIG. 4. Further, the abnormality detection unit 50 in this signal processing system performs processing in accordance with a routine similar to the routine shown in the above-mentioned FIG. 5.

Referring to FIG. 5, the abnormality detection unit 50 acquires the detected pressure value P based on the pressure detection signal from the pressure detection unit 23 (S11: pressure detection step) and judges if gas is leaking from any heater pipe 10 of the three heater pipes 10(1), 10(2) and 10(3) based on whether this detected pressure value P is smaller than the predetermined reference pressure value Pth (S12: leak judging means/leak judging step). The reference pressure value Pth is set as a value smaller than the pressure value Pcont(target value of adjustment) to which the gas pressures in the three heater pipes 10(1), 10(2) and 10(3) should be adjusted (see, for example, FIG. 7). If the detected pressure value P is not smaller than the reference pressure value Pth (at S12, NO), it means gas is not leaking from any of the three heater pipes 10(1), 10(2) and 10(3). After that, in a situation where a state where no gas is leaking from any of the three heater pipes 10(1), 10(2) and 10(3) is maintained, the abnormality detection unit 50 repeatedly acquires the detected pressure value P (S11) and confirms every time that the detected pressure value P is not smaller than the reference pressure value Pth (at S12, NO).

In this regard, if gas (N2 gas) is leaking from one or more of the first heater pipe 10(1), second heater pipe 10(2), and third heater pipe 10(3) due to a pinhole formed in the outside pipe 10b etc., the internal pressure of the first heater pipe 10(1), second heater pipe 10(2), and third heater pipe 10(3) in the state with the inflow of gas restricted by the flow resistance block 21 (orifice plate 213) gradually falls from the pressure value Pcont to be controlled to (target value of adjustment) (see FIG. 7). In the process of the abnormality detection unit 50 repeating the above-mentioned processing (S11, S12), if the decreasing detected pressure value P becomes smaller than the reference pressure value Pth (at S12, YES), the abnormality detection unit 50 deems that a gas leak has occurred (at S12, YES) and outputs an abnormality signal (S13). Further, based on that abnormality detection signal, an alarm is issued from the alarm unit 51.

In the gas leak detecting device 2 such as explained above, if a gas leak occurs in one or more of the three heater pipes 10(1), 10(2), and 10(3) and the detected pressure value P becomes smaller than the reference pressure value Pth, an alarm is issued from the alarm unit 51. Therefore, due to the alarm issued by the alarm unit 51, the operator of the treatment apparatus 1 can know that a pinhole has formed at the outside pipe 10b at one or more of the three heater pipes 10(1), 10(2), and 10(3) or that gas is leaking due to the outside pipe 10b breaking etc.

For example, if there are three (a plurality of) heater pipes 10(1), 10(2), and 10(3) used in parallel for three (a plurality of) etching treatment tanks, the corrosion of the outside pipes 10b due to the chemical will proceed substantially by the same extent. For this reason, if a leak of gas occurs at any one of these three heater pipes 10(1), 10(2), and 10(3), it can be estimated that the outside pipes 10b of the remaining heater pipes 10 are also corroded to the same extent. Therefore, as explained above, if an alarm is issued from the alarm unit 51, it is sufficient to simultaneously deal with the problem by simultaneously replacing all of the heater pipes 10 without identifying the heater pipe at which gas is leaking.

Next, a third embodiment of the present invention will be explained.

Figure 9:
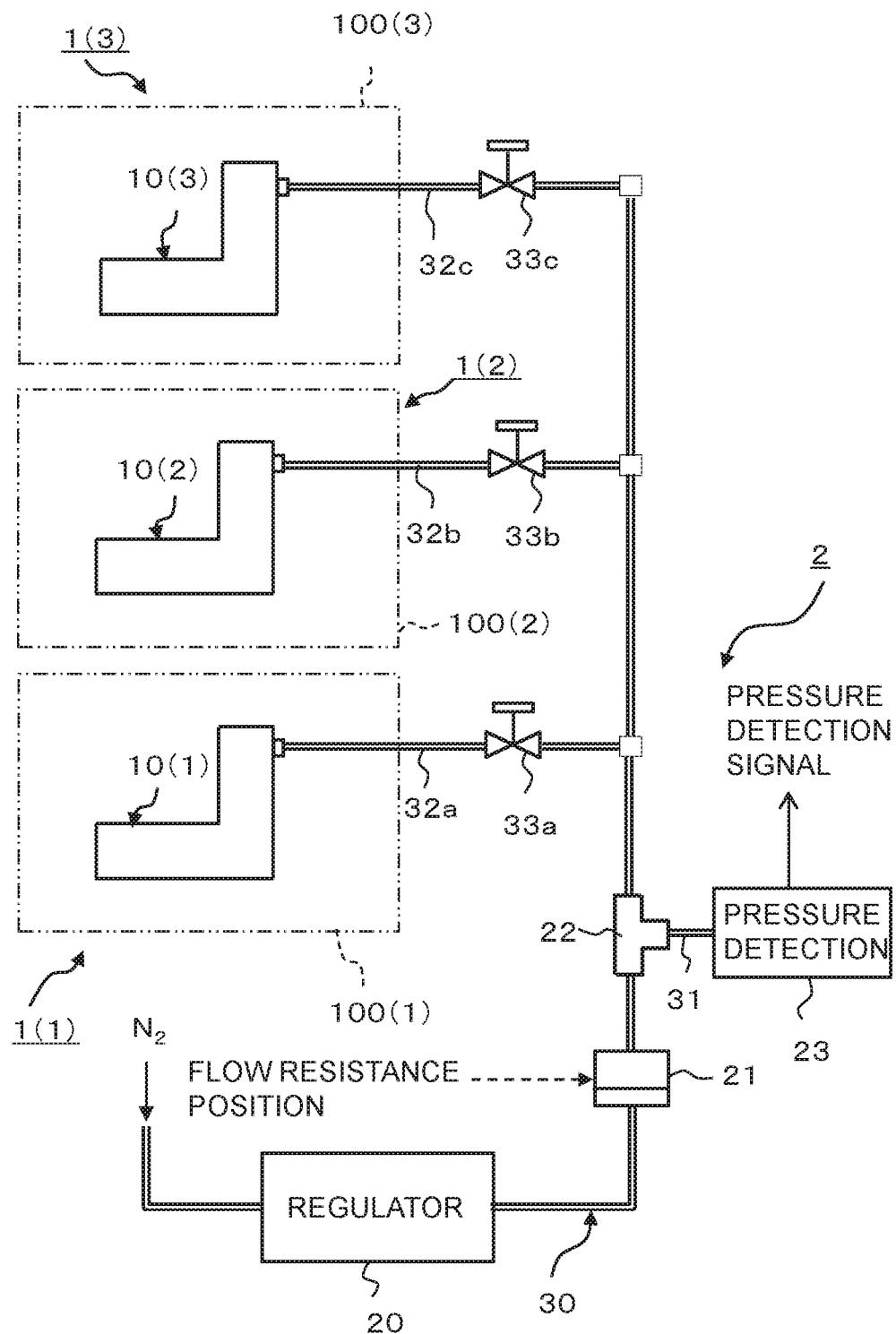
FIG. 9 is a view showing an example of the configuration of a gas leak detecting device according to a third embodiment of the present invention.

The gas leak detecting device according to the third embodiment of the present invention is configured such as shown in FIG. 9. This gas leak detecting device 2 differs from the gas leak detecting device according to the second embodiment (see FIG. 8) on the point of being able to identify the heater pipe in which gas is leaking among the three heater pipes 10(1), 10(2), and 10(3).

In FIG. 9, the branch piping 32a connecting the main piping 30 and the first heater pipe 10(1) is provided with a first on-off valve 33a, while the branch piping 32b connecting the main piping 30 and the second heater pipe 10(2) is provided with a second on-off valve 33b. Further, the branch piping 32c connecting the main piping 30 and the third heater pipe 10(3) is provided with a third on-off valve 33c. The first on-off valve 33a, second on-off valve 33b, and third on-off valve 33c function as pipeline opening/closing mechanisms and are driven to open and close by the opening/closing drive circuit 52 under the control of the later explained abnormality detection unit 50 (see FIG. 10).

Note that, the gas leak detecting device 2 according to the present embodiment is structured the same as the case of the above-mentioned second embodiment (see FIG. 8) other than the three on-off valves 33a, 33b, and 33c.

Figure 10:
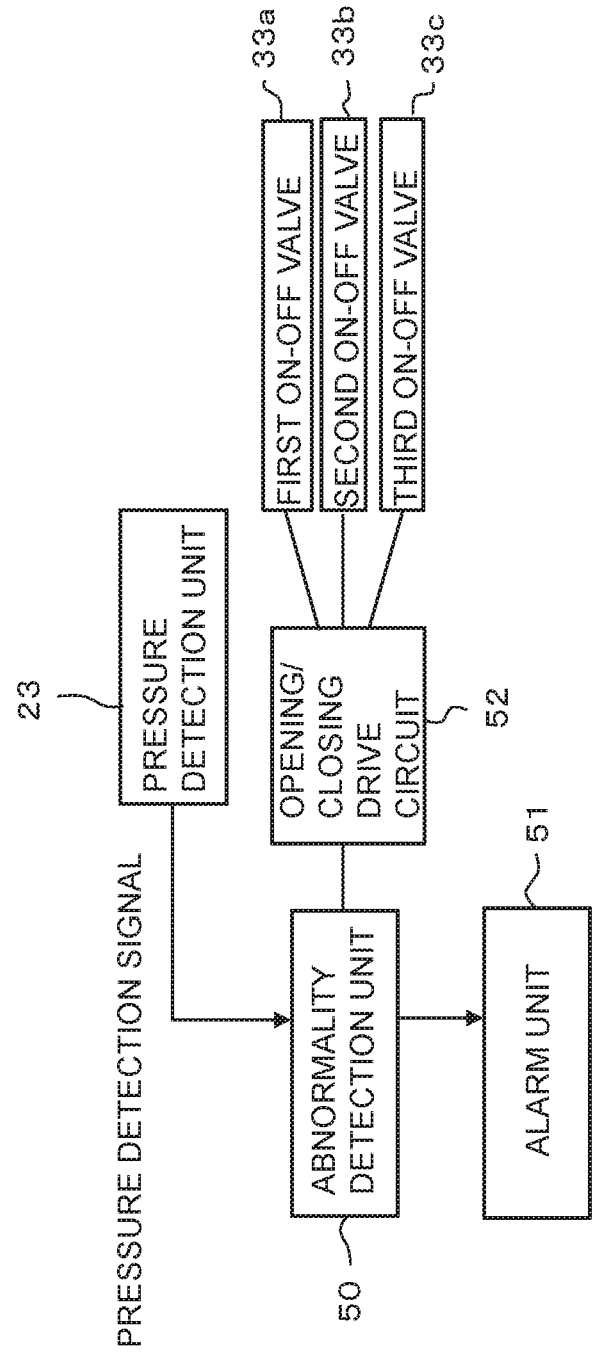
FIG. 10 is a block diagram showing an example of the basic configuration of a signal processing system in the gas leak detecting device shown in FIG. 9.

The signal processing system of the gas leak detecting device 2 is configured such as shown in FIG. 10. In FIG. 10, this signal processing system is configured so that the abnormality detection unit 50 detects a leak of gas from the first heater pipe 10(1), second heater pipe 10(2), and third heater pipe 10(3) based on the detected pressure value P based on the pressure detection signal from the pressure detection unit 23. Further, the abnormality detection unit 50 outputs an abnormality detection signal when detecting that gas is leaking from the heater pipe 10 of any of the first heater pipe 10(1), second heater pipe 10(2), and third heater pipe 10(3). The alarm unit 51 outputs an alarm (alarm message, alarm sound, etc.) (display of message, output of alarm) based on an abnormality detection signal from the abnormality detection unit 50.

Further, the abnormality detection unit 50 controls the opening/closing drive circuit 52 driving the first on-off valve 33a, second on-off valve 33b, and third on-off valve 33c provided at the three branch pipings 32a, 32b, and 32c (pipeline opening/closing mechanism). Further, the abnormality detection unit 50 performs leak identifying processing (leak identifying means) for identifying the heater pipe 10 from which gas is leaking based on the open/closed states of the on-off valves 33a, 33b, and 33c provided at the branch pipings 32a, 32b, and 32c and the detected pressure value P based on the pressure detection signal from the pressure detection unit 23. Note that, at normal times (when no leak is detected), the on-off valves 33a, 33b, and 33c are all controlled to the open state and the regulator 20 is used to adjust the gas pressure inside the heater pipes 10(1), 10(2), and 10(3) through the main piping 30 and branch pipings 32a, 32b, and 32c to the above-mentioned pressure value Pcont (target value of adjustment).

Figure 11:
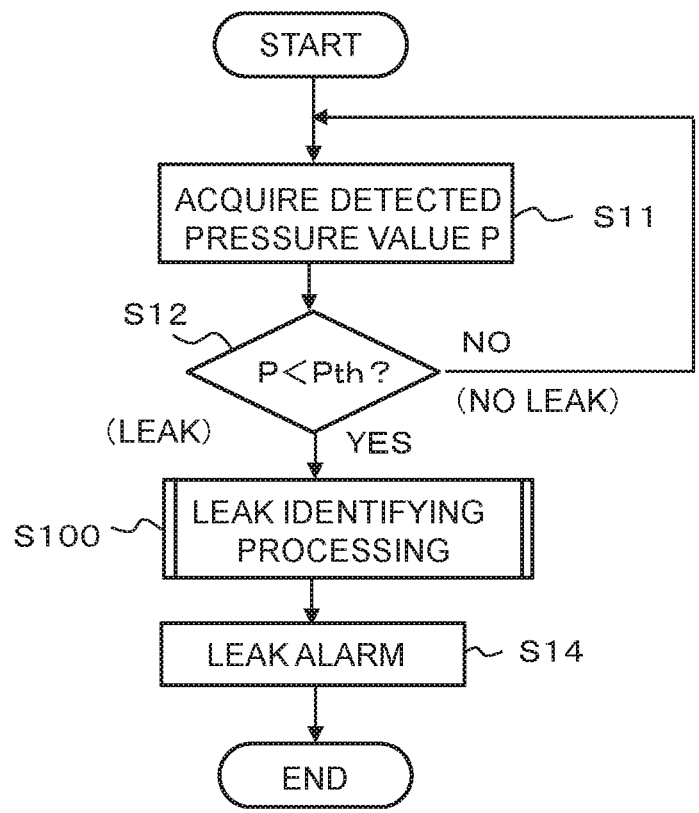
FIG. 11 is a flow chart showing a processing routine of an abnormality detection unit in the signal processing system shown in FIG. 9.

The abnormality detection unit 50 specifically performs processing according to the processing routine shown in FIG. 11.

In FIG. 11, the abnormality detection unit 50 acquires the detected pressure value P based on the pressure detection signal from the pressure detection unit 23 (S11: pressure detection step) and judges if gas is leaking from any heater pipe 10 of the three heater pipes 10(1), 10(2), and 10(3) based on whether this detected pressure value P is smaller than a preset reference pressure value Pth (S12: leak judging means/leak judging step). The reference pressure value Pth is set as a value smaller than the pressure value Pcont (target value of adjustment) to which the gas pressure at the three heater pipes 10(1), 10(2), and 10(3) should be adjusted (see, for example, FIG. 7). If the detected pressure value P is not smaller than the reference pressure value Pth (at S12, NO), it means that gas is not leaking from any of the three heater pipes 10(1), 10(2), and 10(3). After that, in a situation where a state where gas is not leaking from any of the three heater pipes 10(1), 10(2), and 10(3) is being maintained, the abnormality detection unit 50 repeatedly acquires the detected pressure value P (S11) and confirms that the detected pressure value P is not smaller than the reference pressure value Pth (at S12, NO).

Gas (N2 gas) leaks from at least one of the first heater pipe 10(1), second heater pipe 10(2), and third heater pipe 10(3) due to a pinhole formed in the outside pipe 10b etc. Due to this, in the state where the inflow of gas is restricted by the flow resistance block 21 (orifice plate 213), the internal pressures of the first heater pipe 10(1), second heater pipe 10(2), and third heater pipe 10(3) gradually fall from the pressure value Pcont to be controlled (target value of adjustment) (see FIG. 7). In the process of the abnormality detection unit 50 repeatedly performing the above processing (S11 and S12), if the decreasing detected pressure value P becomes smaller than the reference pressure value Pth (at S12, YES), the abnormality detection unit 50 performs leak identifying processing for identifying the heater pipe at which gas is actually leaking among the first heater pipe 10(1), second heater pipe 10(2), and third heater pipe 10(3) (S100: leak identifying means). This leak identifying processing, as explained later, is performed according to the routine shown in FIG. 12A and FIG. 12B.

If the leak identifying processing (S100) ends, the abnormality detection unit 50 outputs leak detection information identifying the heater pipe at which the gas leak has occurred along with an abnormality detection signal (S14). Further, the alarm unit 51 outputs alarm information (for example, turns on an alarm lamp, displays an alarm message, etc.) and outputs information identifying the heater pipe in which a gas leak has occurred based on this abnormality detection signal and leak detection information.

Note that, the abnormality detection unit 50 desirably detects the pressure inside the heater pipe 10 a preset number of times or repeatedly within a preset time if it is first judged that a leak has occurred. The temperature inside the heater pipe 10 is not always constant. Fluctuation occurs. The pressure fluctuates along with that change in temperature. That is, this is so as to prevent a fluctuating pressure from being detected and leaking being mistakenly detected regardless of the heater pipe 10 being normal.

Further, the alarm by the alarm unit 51 (S14) may b performed before performing the leak identifying processing (S100).

Figure 12A:
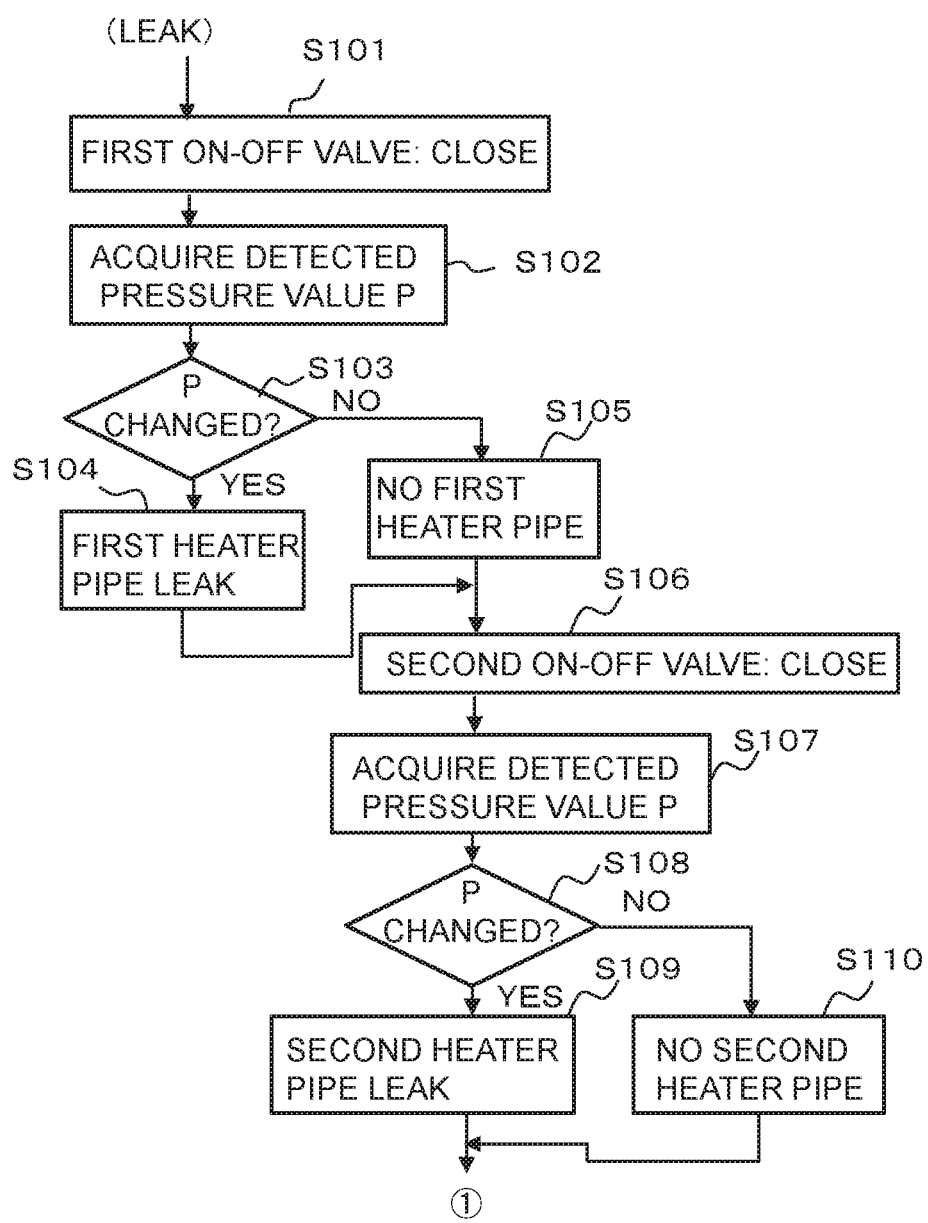
FIG. 12A is a flow chart showing the routine of processing for identifying a leak in the routine shown in FIG. 22 (part 1).
Figure 12B:
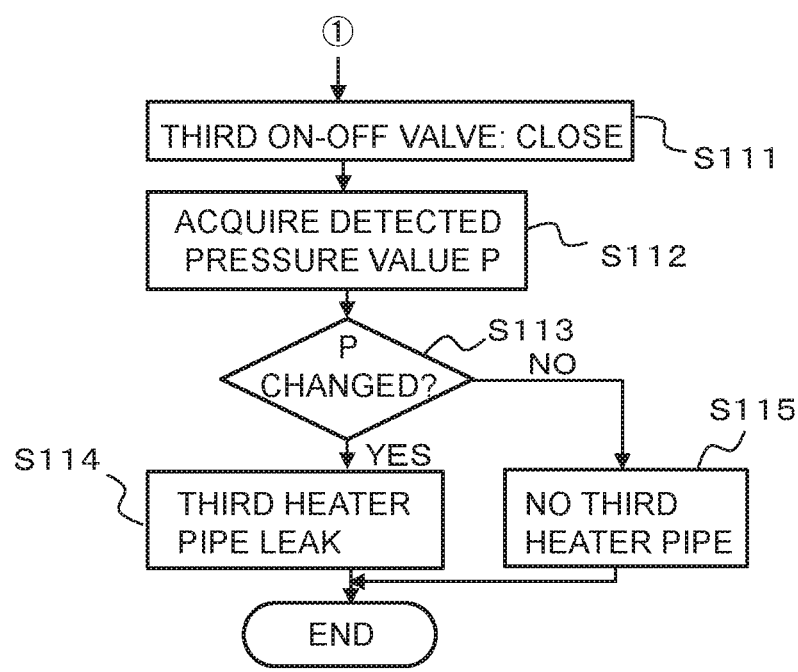
FIG. 12B is a flow chart showing the routine of processing for identifying a leak shown in FIG. 11 (part 2).

The abnormality detection unit 50 performs the leak identifying processing (S100) in accordance with, for example, the routine shown in FIG. 12A and FIG. 12B.

In FIG. 12A, the abnormality detection unit 50 first sets just the first on-off valve 33a in the closed state (S101: pipeline opening/closing step) and acquires the detected pressure value P based on the pressure detection signal from the pressure detection unit 23 (S102: pressure detection step). Further, the abnormality detection unit 50 judges if that detected pressure value P has changed from the detected pressure value P used when performing the leak judgment (see FIG. 11, S11) (S102). The abnormality detection unit 50 judges that gas is leaking from the first heater pipe 10(1) when the detected pressure value P has changed (at S103, YES) (S104: judged gas leak occurring: leak identification step). The judgment in this way is because the change in that detected pressure value P is considered to be due to the fact that the first heater pipe 10(1) in which the gas leak has occurred is separated from the gas flow path (main piping 30, branch piping 32a) whereby the effect of that gas leak is eliminated.

On the other hand, if the detected pressure value P does not change (at S103, NO), the abnormality detection unit 50 judges that gas is not leaking from the first heater pipe 10(1) (S105: judged no gas leak occurring). Further, the abnormality detection unit 50 records the results of judgment regarding the first heater pipe 10(1) ("judged gas leak occurring" or "judged no gas leak occurring").

If the processing for judging a leak of the first heater pipe 10(1) ends, the abnormality detection unit 50 sets just the second on-off valve 33b to the closed state (S106: pipeline opening/closing step) and acquires the detected pressure value P (S107: pressure detection step). Further, the abnormality detection unit 50 judges if the detected pressure value P has changed from the detected pressure value P used when judging a leak (S108). If the detected pressure value P has changed (at S108, YES), the abnormality detection unit 50 judges that gas is leaking from the second heater pipe 10(2) (S109: judged gas leak occurring: leak identification step). On the other hand, if the detected pressure value P has not changed (at S108, NO), the abnormality detection unit 50 judges that gas is not leaking from the second heater pipe 10(2) (S110: judged gas leak not occurring). The abnormality detection unit 50 records the results of judgment for the second heater pipe 10(2) ("judged gas leak occurring" or "judged no gas leak occurring").

After the processing for judging a leak of the first heater pipe 10(1) and the second heater pipe 10(2) ends, the abnormality detection unit 50 proceeds to the processing shown in FIG. 12B, sets just the third on-off valve 33c to the closed state (S111: pipeline opening/closing step), and acquires the detected pressure value P (S112: pressure detection step). Further, the abnormality detection unit 50 judges if the detected pressure value P has changed from the detected pressure value P used when judging a leak (S113). If the abnormality detection unit 50 has changed in the detected pressure value P (at S113, YES), it judges that gas is leaking from the third heater pipe 10(2) (S114: judged gas leak occurring: leak judgment step). On the other hand, if the detected pressure value P has not changed (at S113, NO), the abnormality detection unit 50 judges that gas is not leaking from the third heater pipe 10(2) (S115: judged gas leak not occurring). The abnormality detection unit 50 records the results of judgment of the third heater pipe 10(2) ("judged gas leak occurring" or "judged gas leak not occurring").

If the above-mentioned leak identifying processing (S100) ends, as explained above, the abnormality detection unit 50 provides the recorded results of judgment as the leak detection information to the alarm unit 51 along with the abnormality detection signal. The alarm unit 51 outputs (displays etc.) the information relating to the results of judgment along with the alarm information.

Figure 13A:
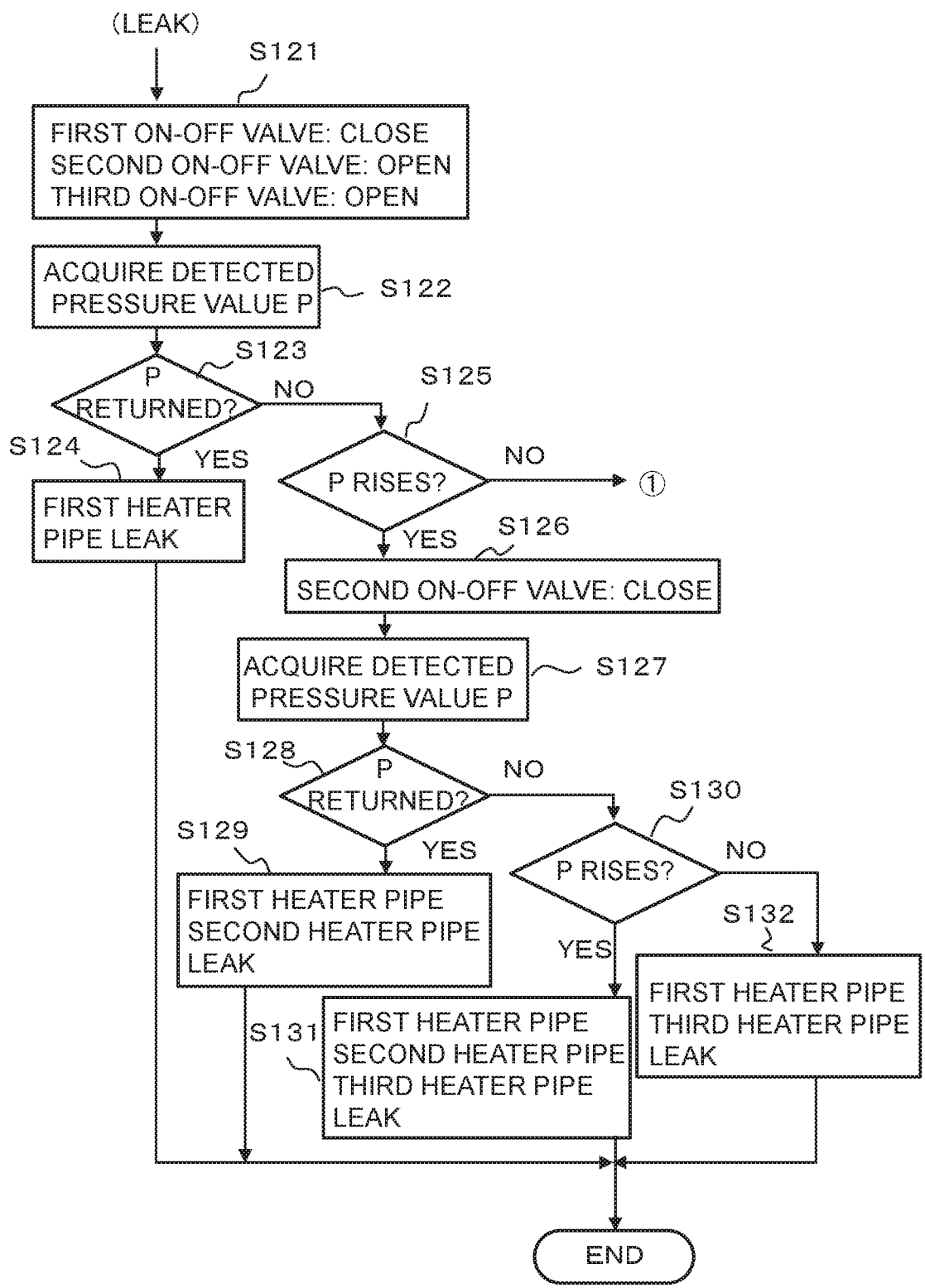
FIG. 13A is a flow chart showing another routine of processing for identifying a leak shown in FIG. 1 (part 1).
Figure 13B:
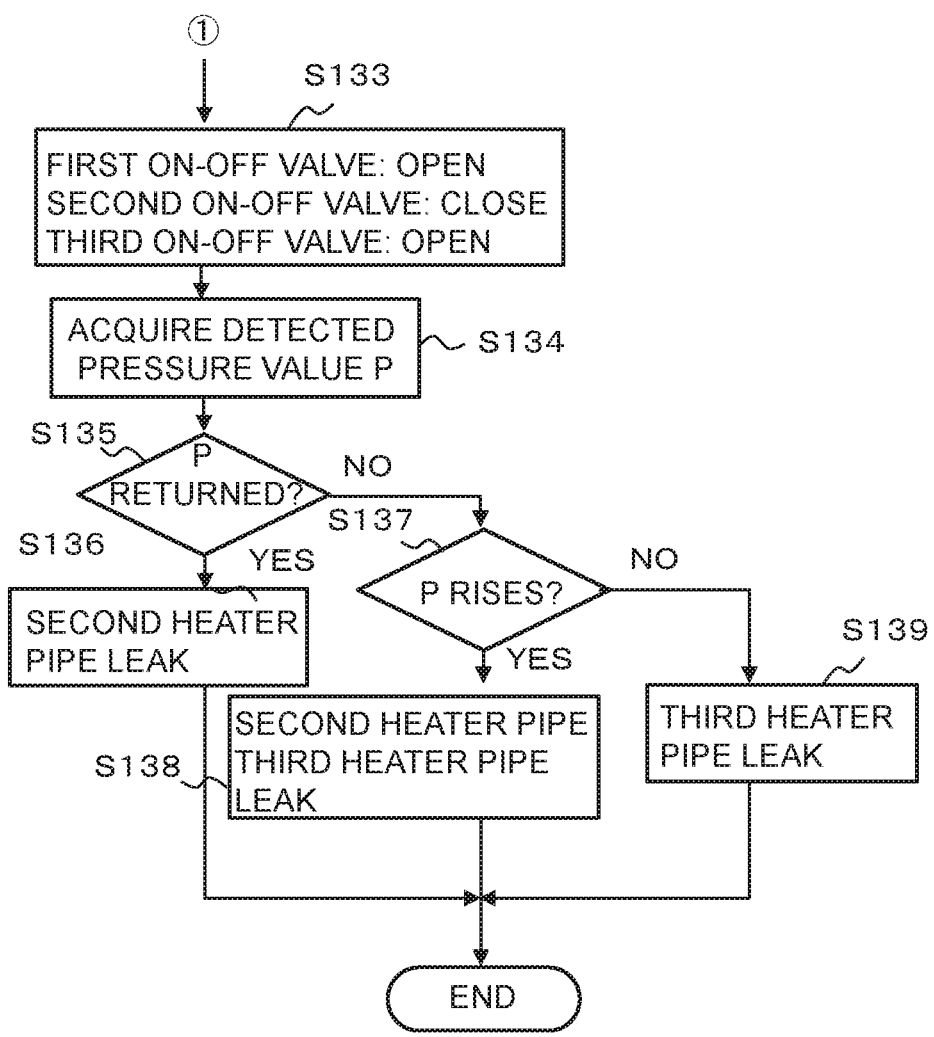
FIG. 13B is a flow chart showing another routine of processing for identifying a leak shown in FIG. (part 2).

The leak identifying processing (S100) can be performed in accordance with the routine shown in FIG. 13A and FIG. 13B.

In FIG. 13A, the abnormality detection unit 50 switches just the first on-off valve 33a among the first on-off valve 33a, second on-off valve 33b, and third on-off valve 33c all in the open state to the closed state (S121: pipeline opening/closing step). In this state, the abnormality detection unit 50 acquires the detected pressure value P based on the pressure detection signal from the pressure detection unit 23 (S122: pressure detection step) and judges if that detected pressure value P has returned to the pressure value Pcont (S123). If it is judged that the detected pressure value P when setting the first on-off valve 33a to the closed state has returned to the pressure value Pcont (at S123, YES), the abnormality detection unit 50 judges that gas is leaking from just the first heater pipe 10(1) (S124: leak identification step) and makes the alarm unit 51 display (output) leak information showing this. In this case, since gas no longer leaks when setting the first on-off valve 33a to the closed state and separating the first heater pipe 10(1) from the main piping 30, it is judged that gas is leaking from just the first heater pipe 10(1).

On the other hand, if even if setting the first on-off valve 33a to the closed state (S121) the detected pressure value P at this time does not return to the target value of adjustment of the pressure value Pcont (at S123, NO), the abnormality detection unit 50 judges there is a leak in another heater pipe 10 as well besides the first heater pipe 10(1). This is a state where even if setting the first on-off valve 33a to the closed state and separating the first heater pipe 10(1) from the main piping 30, leak of gas is not able to be eliminated. Leak of gas cannot be eliminated because there is a leak at a heater pipe 10 other than the first heater pipe (1). Therefore, the abnormality detection unit 50 further judges if that detected pressure value P has risen over the detected pressure value P at the time of leak judgment (see FIG. 11, S11) (S125). This is so as to confirm if there is a leak from the first heater pipe 10(1). That is, if the detected pressure value P when setting the first on-off valve 33a to the closed state does not change (has not risen) from the detected pressure value P at the time of leak judgment, it shows that the operation of the first on-off valve 33a has no effect on the detected pressure P and that gas is not leaking from the first heater pipe 10(1). If the detected pressure value P when setting the first on-off valve 33a to the closed state changes (has risen) from the detected pressure value P at the time of leak judgment, it shows that the operation of the first on-off valve 33a has an effect on the detected pressure P and that gas is leaking from the first heater pipe 10(1).

Therefore, if the detected pressure value P when setting the first on-off valve 33a to the closed state (see S122) has not risen above (has not changed from) the detected pressure value P at the time of leak judgment (at S125, NO), the abnormality detection unit 50 deems that gas is leaking from a heater pipe other than the first heater pipe 10(1) and proceeds to the later explained processing (see FIG. 13B).

Further, if the detected pressure value P when setting the first on-off valve 33a to the closed state (see S122) has risen from the detected pressure value P at the time of leak judgment (at S125, YES), the abnormality detection unit 50 judges that gas is also leaking from another heater pipe 10 in addition to gas leaking from the first heater pipe 10(1) and switches the second on-off valve 33b which had been maintained in the open state to the closed state in addition to the first on-off valve 33a in the closed state (S126: pipeline opening/closing step). In this state, the abnormality detection unit 50 acquires the detected pressure value P based on the pressure detection signal from the pressure detection unit 23 (S127: pressure detection step) and judges if that detected pressure value P has returned to the pressure value Pcont (S128). Here, due to the fact that if returning the detected pressure value P when setting both of the first on-off valve 33a and the second on-off valve 33b to the closed state to the pressure value Pcont (at S128, YES), there is no longer a leak of gas when setting the first on-off valve 33a and the second on-off valve 33b to the closed state to separate the first heater pipe 10(1) and the second heater pipe 10(2) from the main piping 30, the abnormality detection unit 50 judges that gas is leaking from both of the first heater pipe 10(1) and the second heater pipe 10(2) (S129: leak identification step) and makes the alarm unit 51 display (output) leak information showing that.

On the other hand, if the detected pressure value P when setting both of the first on-off valve 33a and the second on-off valve 33b to the closed state (see S121 and S126 (pipeline opening/closing step)) (see S127 (pressure detection step)) has not returned to the pressure value Pcont (at S128, NO), the abnormality detection unit 50 further judges if the detected pressure value P when setting both of the first on-off valve 33a and the second on-off valve 33b to the closed state (see S127) has risen above the detected pressure value P when setting the first on-off valve 33a to the closed state (see S122) (S130). This is so as to confirm if there is a leak from the second heater pipe 10(2). That is, if the detected pressure value P when setting the second on-off valve 33b to the closed state in addition to the closed state of the first on-off valve 33a does not change (does not rise) from the detected pressure value P when only the first on-off valve 33a is in the closed state, this shows that the operation of the second on-off valve 33b has no effect on the detected pressure value P and that no gas is leaking from the second heater pipe 10(2). If the detected pressure value P when the first on-off valve 33a and the second on-off valve 33b are set to the closed state changes (rises) from the detected pressure value P when only the first on-off valve 33a is set to the closed state, this shows that the operation of the second on-off valve 33b has an effect on the detected pressure value P and that gas is leaking from the second heater pipe 10(2). By the process up to here, it is confirmed that gas is leaking from the first heater pipe 10(1) and the third heater pipe 10(3).

Therefore, if the detected pressure value P when setting both the first on-off valve 33a and the second on-off valve 33b to the closed state (see S127) does not rise (does not change) from the detected pressure value P when setting the first on-off valve 33a to the closed state (see S122) (at S130, NO), the abnormality detection unit 50 judges that gas is leaking from the first heater pipe 10(1) and the third heater pipe 10(3) (S132: leak identification step). The alarm unit 51 is made to display (output) leak information showing this.

Further, if the detected pressure value P when setting both of the first on-off valve 33a and the second on-off valve 33b to the closed state (see S127 (pressure detection step)) rises above the detected pressure value P (see S122) when setting the first on-off valve 33a to the closed state (at S130, YES), the abnormality detection unit 50 judges that gas is leaking from the first heater pipe 10(1), second heater pipe 10(2), and third heater pipe 10(3) (S131: leak identification step) and makes the alarm unit 51 display (output) leak information showing that.

In the above-mentioned processing, if the detected pressure value P obtained by setting the first on-off valve 33a to the closed state (see S121, S122) has not returned to the pressure value Pcont (at S123, NO) and does not rise from the detected pressure value P at the time of leak judgment (see FIG. 11, S11) (at S125, NO), at the least, it is deemed that gas is not leaking from the first heater pipe 10(1) and the abnormality detection unit 50 proceeds to the processing shown in FIG. 13B.

In FIG. 13B, the abnormality detection unit 50 returns the first on-off valve 33a to the open state and maintains the third on-off valve 33c at the open state while switching the second on-off valve 33b to the closed state (S133: pipeline opening/closing step). In this state, the abnormality detection unit 50 acquires the detected pressure value P based on the pressure detection signal from the pressure detection unit 23 (S134: pressure detection step) and judges if that detected pressure value P has returned to the pressure value Pcont (S135). If it is judged that the detected pressure value P has returned to the pressure value Pcont (at S115, YES), the abnormality detection unit 50 judges that gas is leaking from just the second heater pipe 10(2) (S136: leak identification step) and makes the alarm unit 51 display (output) leak information showing this. In this case, since the leak of gas is eliminated when the second on-off valve 33b is set to the closed state to separate the second heater pipe 10(2) from the main piping 30, it is judged that gas is leaking from only the second heater pipe 10(2).

Note that, at this time, it is already known that gas is not leaking from the first heater pipe 10(1), so the operation of the first on-off valve 33a does not affect the detected pressure value P. Accordingly, as explained above, when switching the second on-off valve 33b to the closed state, the first on-off valve 33a is set to the closed state as it is and need not be returned to the open state.

On the other hand, even if setting the second on-off valve 33b to the closed state (S133: pipeline opening/closing step), if the detected pressure value P when only the second on-off valve 33b is the closed state (see S134 (pressure detection step)) has not returned to the pressure value Pcont (at S135, NO), the abnormality detection unit 50 further judges if that detected pressure value P has risen from the detected pressure value P at the time of leak judgment (see FIG. 11, S11) (S137). This is so as to confirm whether gas is leaking from the second heater pipe 10(2). That is, if the detected pressure value P when setting only the second on-off valve 33b to the closed state does not change (does not rise) from the detected pressure value P at the time of leak judgment, this shows that operation of the second on-off valve 33b has no effect on the detected pressure P and that no gas is leaking from the second heater pipe 10(2). If the detected pressure value P when setting only the second on-off valve 33b to the closed state has changed (has risen) from the detected pressure value P at the time of leak judgment, this shows that operation of the second on-off valve 33b has an effect on the detected pressure P and that gas is leaking from the second heater pipe 10(2). By the process up to here, it is confirmed that gas is not leaking from the first heater pipe 10(1).

Therefore, if the detected pressure value P when setting only the second on-off valve 33b to the closed state (see S134 (pressure detection step)) does not rise (does not change) from the detected pressure value P at the time of leak judgment (at S137, NO), the abnormality detection unit 50 judges that gas is leaking from other than the second heater pipe 10(1), that is, from just the remaining third heater pipe 10(3) (S139: leak identification step), and makes the alarm unit 51 display (output) leak information showing that.

On the other hand, in the above-mentioned state (at S135, NO), if the detected pressure value P when only the second on-off valve 33b is in the closed state (see S134 (pressure detection step)) has risen from the detected pressure value P at the time of leak judgment (at S137, YES), the abnormality detection unit 50 judges that gas is leaking from the second heater pipe 10(2) and third heater pipe 10(3) (S138: leak identification step) and makes the alarm unit 51 display (output) leak information showing that.

In the gas leak detecting device 2 according to the third embodiment of the present invention, in the same way as the second embodiment, it is possible to detect a leak of gas at one or more of the plurality of heater pipes 10 based on the detected pressure value P based on the pressure detection signal from the pressure detection unit 23 and possible to identify from which heater pipe 10 gas is leaking. That is, it is possible to detect the formation of a pinhole or breakage of the output pipe 10b at any of the plurality of heater pipes 10 due to corrosion by a chemical or external impact etc. and possible to identify in the outside pipe 10b of which heater pipe 10 a pinhole etc. has formed in leak identifying processing (see FIG. 12A and FIG. 12B or FIG. 13A and FIG. 13B).

Due to this, it is possible to perform only the minimum necessary extent of replacement of heater pipes and other maintenance and possible to reduce the time and cost of maintenance. Further, if there are a plurality of treatment tanks and a plurality of heater pipes, it is possible to not provide each with a gas leak detecting device, but to use a single gas leak detecting device to detect abnormalities (leak or breakage) and identify abnormal locations. Therefore, it is possible to reliably detect abnormalities at a low cost.

Note that, if branching the piping, the eases of flow of gas (conductances) from the branching point to the heater pipes 10 preferably are made to become substantially the same. By making the thicknesses, curvatures, lengths, etc. of the pipings from the branching point to the heater pipes 10 and other aspects of the eases of flow of gas at the pipings when gas is flowing substantially the same at all branch pipings, it is possible to make the precision of detection the same.

Note that, in the gas leak detecting device according to the third embodiment, the first on-off valve 33a, second on-off valve 33b, and third on-off valve 33c were operated to open and close by the opening/closing drive circuit 52 based on control of the abnormality detection unit 50, but the invention is not limited to this. The on-off valves may also be opened and closed by manual operation of the operator.

Further, the on-off valves can be made simple ones, so the cost of the system and parts can be kept down.

Note that, if trying to compare the detected pressure values P to identify a leaking heater pipe 10 as explained above, there is also the possibility that, depending on the state of the leak, the difference will be small and cannot be judged. If such a situation is envisioned, as shown in the second embodiment (see FIG. 8), it is possible to detect the occurrence of a leak at any of the plurality of heater pipes 10 without performing leak identifying processing. If doing this, it is not necessary to prepare a pressure detector which can detect a fine pressure difference to identify the leaking heater pipe 10. An inexpensive system can be constructed. Further, even when performing leak identifying processing, when it is not possible to identify the leaking heater pipe during that identifying processing, it is also possible to suspend that processing and replace all of the heater pipes 10.

Next, a gas leak detecting device according to a fourth embodiment will be explained.

The gas leak detecting device according to the fourth embodiment of the present invention, in the same way as the first embodiment, is configured such as shown in FIG. 1. Its signal processing system, in the same way as the case of the first embodiment, is configured such as shown in FIG. 4. Further, the abnormality detection unit 50 of the gas leak detecting device 2 in the treatment apparatus 1 shown in FIG. 1, for example, can perform processing in accordance with the routine shown in FIG. 14. In this fourth embodiment, the target value of adjustment of the internal gas pressure of the heater pipe 10 (sealed container) is switched from the first pressure value Pcont1 to a second pressure value Pcont2 larger than that.

Figure 14:
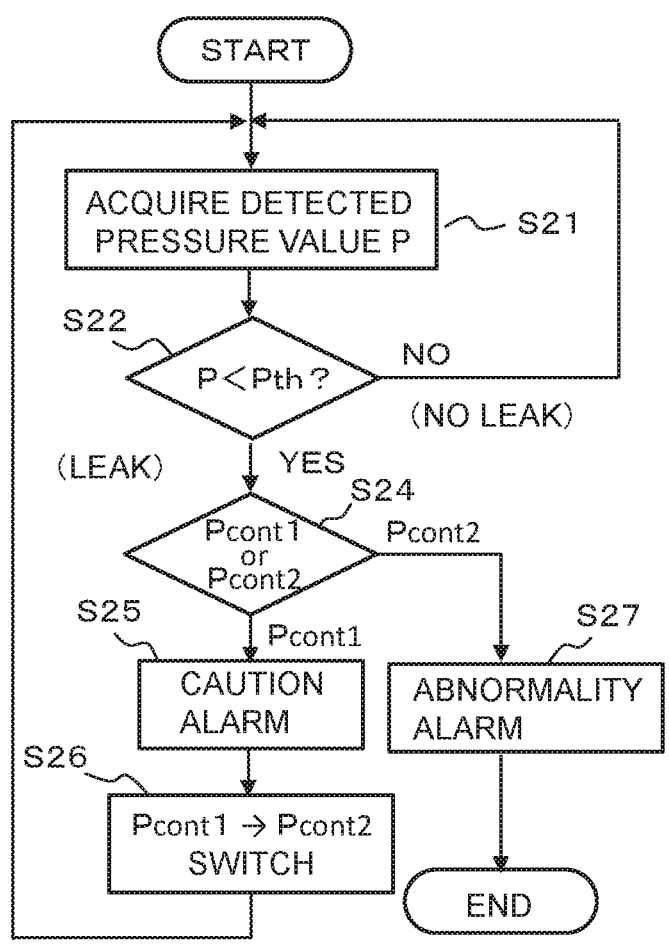
FIG. 14 is a flow chart showing a processing routine of an abnormality detection unit in a gas leak detecting device according to a fourth embodiment of the present invention.

In the state where the gas pressure at the inside of a heater pipe 10 is adjusted by the regulator 20 to the first pressure value Pcont1 used as the target value of adjustment (see FIG. 15), the abnormality detection unit 50 starts processing according to the routine shown in FIG. 14. In FIG. 14, the abnormality detection unit 50 acquires the detected pressure value P based on the pressure detection signal from the pressure detection unit 23 (S21: pressure detection step) and judges whether gas is leaking from the heater pipe 10 based on whether this detected pressure value P is smaller than a predetermined reference pressure value Pth (first reference pressure value) (S22: first leak judging means/first leak judging step). The reference pressure value Pth (first reference pressure value) is set as a predetermined value smaller than the first pressure value Pcont1 used as the target value of adjustment of the gas pressure of the heater pipe 10 (see FIG. 15). If the detected pressure value P is not smaller than the reference pressure value Pth (at S22, NO), it is deemed that no gas is leaking from the heater pipe 10 and the abnormality detection unit 50 acquires a new detected pressure value P based on the pressure detection signal from the pressure detection unit 23 (S21). Further, the abnormality detection unit 50 judges if gas is leaking from the heater pipe 10 based on whether that new detected pressure value P is smaller than the reference pressure value Pth (S22). After that, the abnormality detection unit 50 repeatedly performs acquisition of the detected pressure value P (S21) and judgement of if the detected pressure value P is smaller than the reference pressure value Pth (S22)

In this regard, in the state where the internal gas pressure of the heater pipe 10 is adjusted to the first pressure value Pcont1, the amount of supply of gas (N2 gas) per unit time to the heater pipe 10 through the flow resistance block 21 due to the regulator 20 (orifice plate 213) is relatively small.

Figure 15:
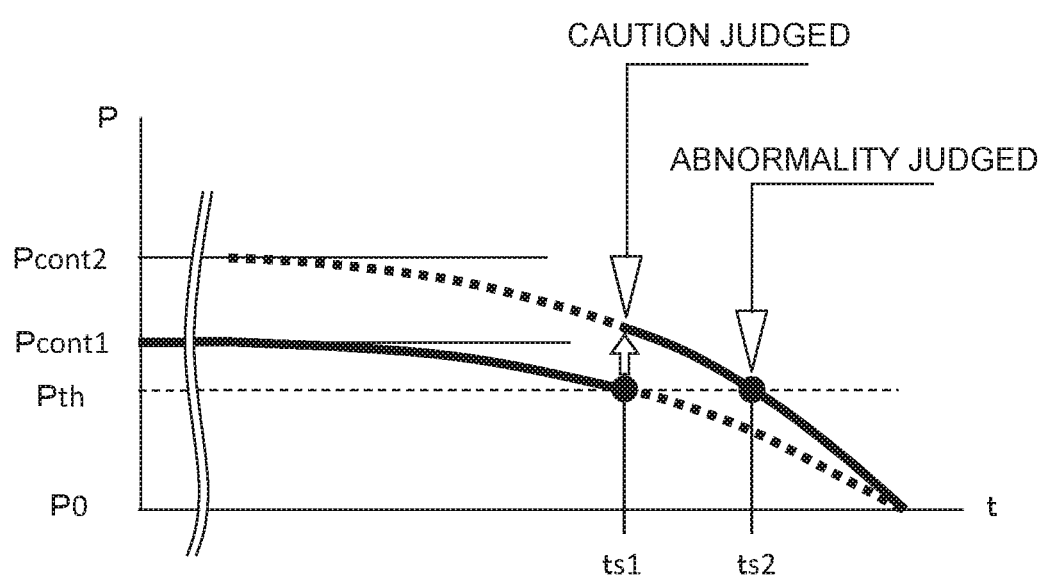
FIG. 15 is a graph showing one example of a change of detected gas pressure accompanying switching of target gas pressure at the time of a leak of the heater pipe.

For this reason, even if a pinhole formed at the heater pipe 10 (outside pipe 10b) is small, due to the leak of gas from that pinhole, the internal gas pressure of the heater pipe 10, that is, the detected pressure value P, for example, as shown in FIG. 15, gradually falls from the first pressure value Pcont1 used as the target value of adjustment and can fall under the reference pressure value Pth lower than the first pressure value Pcont1.

Therefore, even if a pinhole formed at the heater pipe 10 (outside pipe 10b) is small, in the process of the abnormality detection unit 50 repeating the above-mentioned processing (S21, S22, and S23), the detected pressure value P (see S21) gradually falls. Further, if the detected pressure value P becomes smaller than the reference pressure value Pth (at S22, YES), the abnormality detection unit 50 judges if the target value of adjustment at the present point of time of the internal gas pressure of the heater pipe 10 is either of the first pressure value Pcont1 and the second pressure value Pcont2 larger than this (S24). Further, if the abnormality detection unit 50 judges that the target value of adjustment at the point of time of the internal gas pressure of the heater pipe 10 is the first pressure value Pcont1 (at S24, Pcont1), it makes the alarm unit 51 display (output) predetermined caution information (first information) (S25: first information outputting means/first information notifying step). After that, the abnormality detection unit 50 makes the control part 60 of the regulator 20 switch the target value of adjustment of the internal gas pressure of the heater pipe 10 from the first pressure value Pcont1 to a second pressure value Pcont2 larger than that (S26: pressure value switching control means/pressure value switching step).

Due to the processing of the abnormality detection unit 50 explained above, if a small pinhole formed in the heater pipe 10 causes, as shown in FIG. 15, the internal gas pressure of the heater pipe 10 to gradually fall from the first pressure value Pcont1 and the corresponding detected pressure value P (see S21) to fall below the reference pressure value Pth at the time ts1 (at S22, YES: caution judged), the target value of adjustment of the internal gas pressure of the heater pipe 10 is switched from the first pressure value Pcont1 to the second pressure value Pcont2 larger than this. Due to this, the regulator 20 adjusts (increases) the pressure of the gas (N2 gas) supplied through the flow resistance block 21 to the heater pipe 10 so that the detected pressure value P becomes the second pressure value Pcont2. In this way, the target value of adjustment of the internal gas pressure of the heater pipe 10 is switched from the first pressure value Pcont1 to the second pressure value Pcont2 larger than this, so the amount of supply of gas supplied per unit time to the heater pipe 10 where the gas leak occurs increases. Due to this, the internal pressure of the heater pipe 10 temporarily rises such as shown in FIG. 15.

This being so, the situation becomes one where the detected pressure value P (see S21 (pressure detection step)) becomes larger than the reference pressure value Pth (at S22, NO) and it is judged that gas is not leaking from the heater pipe 10. In this state, the abnormality detection unit 50 again repeats the above-mentioned processing (S21, S22, S23) including processing judging whether gas is leaking from the heater pipe 10 based on whether the detected pressure value P is smaller than a reference pressure value Pth (second reference pressure value of the same value as the first reference pressure value) (S22: second leak judging means/second leak judging step). If, in this state, for example, corrosion of the heater pipe 10 (outside pipe 10b) by the chemical advances and the pinhole becomes larger, the amount of gas leaking from the heater pipe 10 per unit time increases. The temporarily increased internal pressure of the heater pipe 10 gradually falls.

Further, due to the increasingly large pinhole of the heater pipe 10, as shown in FIG. 15, the internal gas pressure of the heater pipe 10 gradually falls from the second pressure value Pcont2. If the corresponding detected pressure value P (see S21) falls below the reference pressure value Pth at the time ts2 (at S22, YES: abnormality judged), the abnormality detection unit 50 confirms that the target value of adjustment of the internal gas pressure of the heater pipe 10 is the second pressure value Pcont2 (see S24, Pcont2), then makes the alarm unit 51 display (output) predetermined alarm information (second information) instead of the caution information (see S25) (S27: second information outputting means/second information notifying step). After that, the abnormality detection unit 50 ends the processing for detecting a leak of gas from the heater pipe 10.

According to the above-mentioned such processing (see FIG. 14), in a situation in which a pinhole formed in the heater pipe 10 (outside pipe 10b) is small and the amount of leak of the gas is relatively small, caution information is displayed (output) at the alarm unit 51. Further, in a situation where that pinhole becomes larger due to corrosion by a chemical etc. and the amount of leak of gas is large, alarm information instead of caution information is displayed (output) at the alarm unit 51. Due to this, the operator can learn from the caution information displayed at the alarm unit 51 that a small pinhole has formed at the heater pipe 10 (outside pipe 10b), so the timing for replacement of the heater pipe 10 is approaching and can prepare a new heater pipe 10. After that, when the alarm unit 51 displays alarm information, the operator learns from the alarm information displayed (output) at the alarm unit 51 that the pinhole formed at the heater pipe 10 has become larger and that heater pipe 10 must be replaced and can smoothly replace the heater pipe 10 at which that pinhole formed with the new heater pipe 10 prepared in advance.

Further, as explained above, when detecting a leak of gas due to a slight pinhole formed in the heater pipe 10, it is possible to switch the target value of adjustment of the internal pressure value of the heater pipe 10 from Pcont1 to Pcont2 larger than the same so as to increase the pressure drop of the heater pipe 10 (increase the pressure difference) and make the subsequent detection of a leak more reliable.

Note that, in the processing according to the routine shown in FIG. 14, the reference pressure value Pth set when the target value of adjustment of the internal gas pressure of the heater pipe 10 is the first pressure value Pcont1 (first reference pressure value) and the reference pressure value Pth set when the target value of adjustment is a second pressure value Pcont2 larger than the first pressure value Pcont1 (second reference pressure value) were the same, but the invention is not limited to this. The reference pressure value Pth set when the target value of adjustment of the internal gas pressure of the heater pipe 10 is the second pressure value Pcont2 (second reference pressure value) need only be a value the same as or larger than the reference pressure value Pth set when the target value of adjustment is the first pressure value Pcont1 and a value smaller than the second pressure value Pcont2. Further, the reference pressure value Pth was set two times but may also be set more than two times. Due to this, it is possible to display a plurality of alarm information to confirm the state of a pinhole of the heater pipe 10. The conditions for setting the reference pressure value Pth are found by experiments or experience.

Next, a gas leak detecting device according to a fifth embodiment of the present invention will be explained.

Figure 16A:
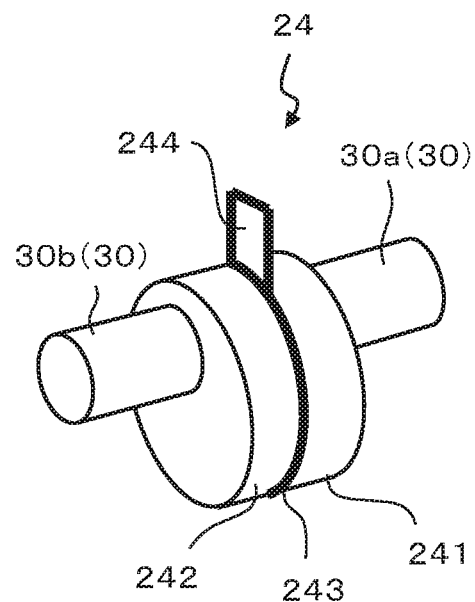
FIG. 16A is a perspective view showing an appearance and structure of a variable flow resistance block used in the gas leak detecting device according to a fifth embodiment of the present invention.
Figure 16B:
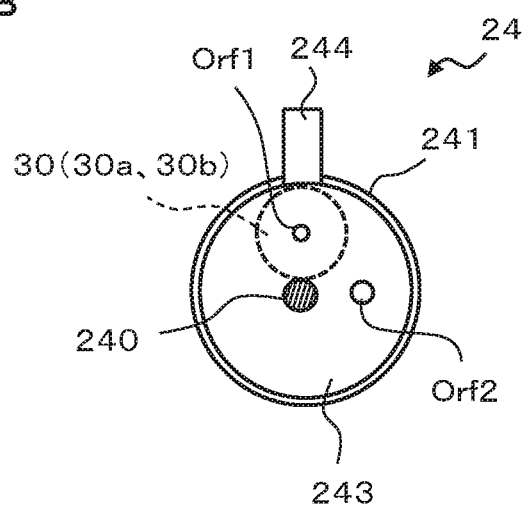
FIG. 16B is a front see-through view showing the inside of the variable flow resistance block shown in FIG. 16A.

In the gas leak detecting device according to the fifth embodiment of the present invention, in the configuration shown in FIG. 1, instead of the flow resistance block 21 of the structure shown in FIG. 3, the variable flow resistance block 24 of the structure shown in FIG. 16A and FIG. 16B (gas variable flow resistance part) can be used. Note that, FIG. 16A is a perspective view showing the appearance and structure of the variable flow resistance block 24, while FIG. 16B is a front see-through view showing the inside of the variable flow resistance block 24.

In FIG. 16A and FIG. 16B, the variable flow resistance block 24 has a support block 241 in which the upstream side piping 30a extending from the regulator 20 is inserted and a support block 242 in which the downstream side piping 30b extending toward the T-joint 22 is inserted. The upstream side piping 30a and the downstream side piping 30b face each other across the support block 241 and the support block 242. Further, between the support block 241 and the support block 242, a rotating plate 243 (movable member) is provided. This rotating plate 243 is supported in a state sandwiched between the first support block 241 and the second support block 242 to be able to rotate about a shaft 240 provided at a position away from the upstream side piping 30a and the downstream side piping 30b. The rotating plate 243 is provided with a plurality of orifices Orf differing in inside diameters. Further, the respective orifices Orf are provided in the radial direction from the rotary shaft 240 so that the centers of inside diameters of the respective orifices Orf match the center of the piping of the upstream side piping 30a and the downstream side piping 30b. At the rotating plate 243, a lever 244 is formed so as to stick out from the peripheral edge part of the rotating plate 243. For example, as shown in FIG. 16B, as the above-mentioned plurality of orifices Orf, two orifices of the first orifice Orf1 and the second orifice Orf2 can be provided. Further, the inside diameter of the second orifice Orf2 can be set larger than the inside diameter of the first orifice Orf1.

By making the rotating plate 243 rotate about the shaft 240 due to the lever 244, either of the first orifice Orf1 and the second orifice Orf2 can be switched to and placed between the end face of the upstream side piping 30a (plane surrounded by circular end edge) and the end face of the downstream side piping 30b (plane surrounded by circular end edge). Due to either of the first orifice Orf1 and the second orifice Orf2 being arranged between the end face of the upstream side piping 30a and the end face of the downstream side piping 30b, the upstream side piping 30a and the downstream side piping 30b are communicated through that orifice Orf1 or Orf2.

In the variable flow resistance block 24 of the above-mentioned such structure, in the gas (N2 gas) flow path from the upstream side piping 30a to the downstream side piping 30b, the flow of gas (N2 gas) becomes difficult due to the first orifice Orf1 or the second orifice Orf2 of the rotating plate 243. Here, if the second orifice Orf2 with a larger size of inside diameter than the first orifice Orf1 is inserted inside the gas flow path, it is easier for gas to flow through the flow path compared to when the first orifice Orf1 is inserted into the gas flow path. That is, the second orifice Orf2 with a larger size of inside diameter than the first orifice Orf1 makes it easier for the gas to flow through the gas flow path.

If using the variable flow resistance block 24 of the above-mentioned such structure (variable gas flow resistance part), the abnormality detection unit 50 can perform processing according to the routine based on the routine shown in FIG. 14.

For example, in the variable flow resistance block 24, in the state where the first orifice Orf1 is placed in the gas flow path (piping 30), that is, in the state where it is made hard for gas to flow by a first extent in the piping 30, the abnormality detection unit 50 starts the processing according to the routine based on the routine shown in FIG. 4. That is, the abnormality detection unit 50 acquires the detected pressure value P based on the pressure detection signal (corresponding to S21 (first pressure detection step)) and judges whether gas is leaking from the heater pipe 10 based on whether this detected pressure value P is smaller than a predetermined reference pressure value Pth (first reference pressure value) (S22: first leak judging means/first leak judging step). The reference pressure value Pth (first reference pressure value) is set as a predetermined value smaller than the pressure value Pcont used as the target value of adjustment of the gas pressure of the heater pipe 10.

Note that, the size of the inside diameter of the first orifice Orf1 can, for example, be set to 0.25 mm. In this case, the size of the inside diameter of the second orifice Orf2 can, for example, be set to 0.3 mm.

In this regard, in the variable flow resistance block 24, in the state where the first orifice Orf1 is arranged in the gas flow path (piping 30), the amount of supply of gas (N2 gas) to the heater pipe 10 per unit time through the variable flow resistance block 24 (first orifice Orf1) according to the regulator 20 is relatively small. For this reason, even if the pinhole formed at the heater pipe 10 (outside pipe 10b) is small, due to the leak of gas from that pinhole, the internal gas pressure of the heater pipe 10, that is, the detected pressure value P, will gradually fall from the pressure value Pcont used as the target value of adjustment and will fall below the reference pressure value Pth lower than that pressure value Pcont.

Therefore, even if a pinhole formed at the heater pipe 10 (outside pipe 10b) is small, the detected pressure value P acquired in the process of this processing gradually falls. Further, if the detected pressure value P becomes smaller than the reference pressure value Pth (corresponding to YES at S22), the abnormality detection unit 50 causes the alarm unit 51 to display (output) predetermined caution information (first information) (corresponding to S25: first information outputting means/first information notifying step). The operator views the caution information displayed at the alarm unit 51 and operates the lever 244 of the variable flow resistance block 24 to place the second orifice Orf2 at the gas flow path (piping 30).

In this way, if the second orifice Orf2 larger than the first orifice Orf1 is placed inside the gas passage (piping 30), the amount of gas supplied per unit time to the heater pipe 10 in which a gas leak has occurred adjusted by the regulator 20 to the pressure value Pcont increases. Due to this, the internal gas pressure of the heater pipe 10 temporarily rises. This being so, the detected pressure value P (see S21 (second pressure detection step)) becomes larger than the reference pressure value Pth (corresponding to NO at S22) and it is judged that gas is not leaking from the heater pipe 10. In this state, the abnormality detection unit 50 again performs processing including processing for judging if gas is leaking from the heater pipe 10 based on whether the detected pressure value P is smaller than the reference pressure value Pth (second reference pressure value of same value as first reference pressure value) (corresponding to S22: second leak judging means/second leak judging step). In this state, for example, if the heater pipe 10 (outside pipe 10b) is increasingly corroded by a chemical and the pinhole becomes larger, the amount of gas leaking from the heater pipe 10 per unit time increases. This being so, the inside pressure of the heater pipe 10 which had temporarily increased gradually falls.

Further, if, due to the increasingly large pinhole of the heater pipe 10, the internal gas pressure of the heater pipe 10 gradually falls from the pressure value Pcont and the corresponding detected pressure value P falls below the reference pressure value Pth (corresponding to YES at S22), the abnormality detection unit 50 makes the alarm unit 51 display (output) predetermined alarm information (second information) instead of the caution information (corresponding to S25) (S27: corresponding to second information outputting means/second information notifying step). After that, the abnormality detection unit 50 ends the processing for detecting a leak of gas from the heater pipe 10.

According to the processing such as explained above, in the same way as the case of processing shown in FIG. 14, due to the caution information displayed (output) at the alarm unit 51 and alarm information switched from the same, if a pinhole is formed in a heater pipe 10 (outside pipe 10b) advancing in corrosion due to a chemical, that heater pipe 10 can be smoothly replaced with a new heater pipe 10 prepared in advance.

Note that, in the above-mentioned variable flow resistance block 24, either of the first orifice Orf1 and the second orifice Orf2 was manually switched to inside the gas passage (piping 30), but the invention is not limited to this. A drive mechanism using a motor or solenoid etc. can be used to switch the orifices. In this case, the abnormality detection unit 50 can control switching of the orifice at the variable resistance block 24.

In the embodiments of the present invention described above, the heater pipe was filled with nitrogen gas (N2) and that gas pressure was adjusted to a predetermined pressure value, but it is also possible to fill another gas (for example, air) and adjust that gas pressure to a predetermined pressure value.

Further, in the above-mentioned embodiments of the present invention, leak of gas of the heater pipe 10 was detected based on the reference pressure value Pth, but this was described as an example. For example, the graphs shown in FIG. 7 and FIG. 15 may be used to monitor the amounts of change of the graphs (degree by which pressure falls) over time and detect a leak based on the preset amount of change.

Further, note that, in the embodiments of the present invention described above, the flow resistance block 21 formed with an orifice Orf inside piping 30 extending from the regulator 20 to the heater pipe 10 (see FIG. 3) and the variable flow resistance block 24 formed with a first orifice Orf1 and a second orifice Orf2 (see FIG. 16A and FIG. 16B) were provided, but the invention is not limited to these. The piping 30 used as the gas passage is not particularly limited so long as making the flow of gas locally difficult. It is also possible to provide projections etc. inside the piping 30 so as to make the flow of gas difficult.

Above, embodiments of the present invention and modifications of the parts were explained, but the embodiments and modifications of the parts show examples and are not intended to limit the scope of the invention. The above-mentioned new embodiments can be worked in various manners. Various elements can be omitted, replaced, or changed within a range not departing from the gist of the invention. These embodiments and their modifications are included in the scope and gist of the invention and are included in the invention described in the claims.

REFERENCE SIGNS LIST 1, 1(1), 1(2), 1(3) treatment apparatus
2 gas leak detecting device
10 heater pipe
10a inside pipe
10b outside pipe
10(1) first heater pipe
10(2) second heater pipe
10(3) third heater pipe
11 heater wire (heater element)
12a, 12b, 12c, 13a, 13b, 13c spacers
14 cap
15 power line
16 joint
20 regulator (pressure adjustment mechanism)
21 flow resistance block (gas flow resistance part)
211 projecting block
212 recessed block
213 orifice plate
22 T-joint
23 pressure detection unit
24 variable flow resistance block (variable gas flow resistance part)
240 shaft
241 rotating plate
242 first support block
243 second support block
244 lever
30 piping, main piping
30a upstream side piping
30b downstream side piping
32a, 32b, 32c branch piping
33a first on-off valve
33b second on-off valve
33c third on-off valve
40 power source
50 abnormality detection unit
51 alarm unit
52 opening/closing drive circuit
100, 100(1), 100(2), 100(3) treatment tank

The invention claimed is:

1. A gas leak detecting device of a heater pipe which is provided with an inside pipe housing a heater element and an outside pipe sealed surrounding the inside pipe, is coupled by piping with a pressure adjustment mechanism, and is adjusted by the pressure adjustment mechanism in gas pressure in a space between the outside pipe and the inside pipe to a predetermined pressure value, the gas leak detecting device comprising:
    a gas flow resistance part provided at the piping and locally resistant to flow of gas at the piping defining a gas flow path,
    a pressure detection unit detecting gas pressure in the space between the outside pipe and the inside pipe of the heater pipe at a position between the gas flow resistance part and the heater pipe in the piping, and
    a leak judging device that judges whether the heater pipe is leaking based on a detected pressure value obtained by the pressure detection unit.

2. The gas leak detecting device of a heater pipe according to claim 1, wherein
    the leak judging device has a pressure judging device that judges if the detected pressure value obtained by the pressure detection unit is smaller than a reference pressure value which is set to a value smaller than a predetermined pressure value to which the gas pressure of the space between the outside pipe and the inside pipe of the heater pipe should be adjusted, and judges if the heater pipe is leaking based on the results of judgment of the pressure judging device.

3. The gas leak detecting device of a heater pipe according to claim 1, wherein the gas flow resistance part has a member in which is formed an orifice which has an area smaller than the cross-sectional area of the piping and through which a gas can pass.

4. The gas leak detecting device of a heater pipe according to claim 1, wherein the heater pipe is coupled to each of a plurality of branch pipings extending branched from the piping extending from the pressure adjustment mechanism.

5. The gas leak detecting device of a heater pipe according to claim 4, further comprising:

a pipeline opening/closing mechanism setting each of the plurality of branch pipings to either of an open state and a closed state and a leak identifying device that identifies a heater pipe from which the gas is leaking among the plurality of heater pipes based on open/closed states of the plurality of branch pipings set to either of an open state and closed state by the pipeline opening/closing mechanism and detected pressure values obtained by the pressure detection unit in the open/closed states of the plurality of branch pipings when it is judged by the leak judging device that gas is leaking from any of the plurality of heater pipes.

6. The gas leak detecting device of a heater pipe according to claim 1, further comprising a pressure value switching controller for switching a target value of adjustment of the gas pressure in the space between the outside pipe and the inside pipe of the heater pipe to a second pressure value larger than a first pressure value when the detected pressure value obtained by the pressure detection unit is smaller than a first reference pressure value set to a value smaller than the first pressure value in the state where the gas pressure between the output pipe and the inside pipe of the heater pipe is adjusted by the pressure adjustment mechanism to the first pressure value used as the target value of adjustment.

7. The gas leak detecting device of heater pipe according to claim 1, wherein the gas flow resistance part comprises a gas variable flow resistance part which is provided in the piping and switches to either locally making it difficult for the gas to flow by a first resistance in the piping defining the gas flow path or making it difficult for it to flow by a second resistance smaller than the first resistance.

8. The gas leak detecting device of a heater pipe according to claim 7, wherein the gas variable flow resistance part has a movable member formed with a first orifice which has an area smaller than the cross-sectional area of the piping and through which a gas passes and a second orifice which has an area smaller than the cross-sectional area of the piping and larger than the area of the first orifice and through which a gas passes, the movable member being moved so that either of the first orifice and second orifice is switched to at the inside of the piping.

9. The gas leak detecting device of a heater pipe according to claim 1, wherein the heater pipe is a heater pipe which is inserted into a treatment solution stored in a treatment tank and treating a treated object and which heats the treatment solution.

10. A gas leak detecting method of a heater pipe which is provided with an inside pipe housing a heater element and an outside pipe sealed surrounding the inside pipe, is coupled by piping with a pressure adjustment mechanism, and is adjusted by the pressure adjustment mechanism in gas pressure in a space between the outside pipe and the inside pipe to a predetermined pressure value, the gas leak detecting method comprising:

a pressure detection step detecting gas pressure in the space between the outside pipe and the inside pipe of the heater pipe at a position between the gas flow resistance part and the heater pipe in a state making flow of gas locally harder at a flow resistance position of the piping defining a gas flow path, and a leak judging step judging whether gas is leaking from the heater pipe based on a detected pressure value obtained in the pressure detection step.

11. The gas leak detecting method of a heater pipe according to claim 10, wherein the heater pipe is coupled to each of a plurality of branch pipings extending ranched from the piping extending from the pressure adjustment mechanism, the gas leak detecting method further comprising:

a pipeline opening/closing step setting each of a plurality of branch pipings to either of an open state and a closed state when it is judged by the leak judging step that gas is leaking from any one of the plurality of heater pipes, and a leak identifying step identifying a heater pipe from which the gas is leaking among the plurality of heater pipes based on detected pressure values obtained by the pressure detection step performed after each of the plurality of branch pipings becomes either of the open state and closed state by the pipeline opening/closing step and open/closed states of the plurality of branch pipings.

12. The gas leak detecting method of a heater pipe according to claim 10, further comprising:

a first leak judging step judging if gas is leaking from the heater pipe based on whether a detected pressure value obtained at the pressure detection step is smaller than a first reference pressure value used as a target value of adjustment set to a value smaller than a first pressure value in a state where a gas pressure of a space between the outside pipe and the inside pipe of the heater pipe is adjusted by the pressure adjustment mechanism to the first pressure value, a pressure value switching step switching the target value of adjustment of gas pressure of the space between the output pipe and the inside pipe of the heater pipe from the first pressure value to a second pressure value larger than that when it is judged by the first leak judging step that gas is leaking from the heater pipe, and a second leak judging step judging if gas is leaking from the heater pipe based on whether a detected pressure value obtained at the pressure detection step is smaller than a second reference pressure value in a state where a gas pressure in a space between the outside pipe and the inside pipe of the heater pipe is adjusted by the pressure adjustment mechanism to the second pressure value.

13. The gas leak detecting method of a heater pipe according to claim 12, further comprising:

a first information notifying step notifying first information when it is judged by the first leak judging step that gas is leaking from the heater pipe, and a second information notifying step notifying second information different from the first information when it is judged by the second leak judging step that gas is leaking from the heater pipe.

14. The gas leak detecting method of a heater pipe according to claim 10, further comprising:
- a first pressure detection step detecting gas pressure in the space between the outside pipe and the inside pipe of the heater pipe at a position between a flow resistance position and the heater pipe in the state making flow of gas locally harder by a first resistance at the flow resistance position of the piping,
- a first leak judging step judging whether gas is leaking from the heater pipe based on whether a detected pressure value obtained at the first pressure detection step is smaller than a first reference pressure value set to a value smaller than the predetermined pressure value to which the gas pressure in the space between the outside pipe and the inside pipe of the heater pipe should be adjusted,
- a second pressure detection step detecting gas pressure in the space between the outside pipe and the inside pipe of the heater pipe at a position between the flow resistance position and the heater pipe in a state where the difficulty of flow of gas at the flow resistance position has been switched to a second resistance smaller than the first resistance when it is judged by the first leak judging step that gas is leaking from the heater pipe, and
- a second leak judging step judging whether gas is leaking from the heater pipe based on whether a detected pressure value obtained at the second pressure detection step is smaller than a second reference pressure value.

15. The gas leak detecting method of a heater pipe according to claim 14, further comprising:
- a first information notifying step notifying first information when it is judged by the first leak judging step that gas is leaking from the heater pipe and
- a second information notifying step notifying second information different from the first information when it is judged by the second leak judging step that gas is leaking from the heater pipe.

* * * * *